(12) United States Patent
Vincent et al.

(10) Patent No.: US 10,013,166 B2
(45) Date of Patent: Jul. 3, 2018

(54) VIRTUAL TAPE LIBRARY SYSTEM

(71) Applicant: Amazon Technologies, Inc., Reno, NV (US)

(72) Inventors: Pradeep Vincent, Kenmore, WA (US); Craig Carl, Seattle, WA (US); Arun Sundaram, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 573 days.

(21) Appl. No.: 13/722,743

(22) Filed: Dec. 20, 2012

(65) Prior Publication Data

US 2014/0181395 A1 Jun. 26, 2014

(51) Int. Cl.
G06F 12/00 (2006.01)
G06F 3/06 (2006.01)
G06F 11/14 (2006.01)

(52) U.S. Cl.
CPC .......... *G06F 3/0605* (2013.01); *G06F 3/0664* (2013.01); *G06F 3/0683* (2013.01); *G06F 11/1456* (2013.01); *G06F 2201/815* (2013.01)

(58) Field of Classification Search
CPC ... G06F 3/0686; G06F 3/0664; G06F 11/1456
USPC ........................................................ 711/111
See application file for complete search history.

(56) References Cited

U.S. PATENT DOCUMENTS 4,873,589 A 10/1989 Inazawa et al.
5,194,996 A 3/1993 Shores
5,297,124 A 3/1994 Plotkin et al.
5,485,321 A 1/1996 Leonhardt et al.
(Continued)

FOREIGN PATENT DOCUMENTS

CN 1489737 4/2004
CN 1862476 11/2006
(Continued)

OTHER PUBLICATIONS

International Search Report and Written Opinion dated Jun. 2, 2014, International Patent Application No. PCT/US2013/075191, filed Dec. 13, 2013.
(Continued)

*Primary Examiner* — Prasith Thammavong
(74) *Attorney, Agent, or Firm* — Davis Wright Tremaine LLP

(57) ABSTRACT

A virtual tape library system is used to back up data from a client archive system expecting physical tape operations onto logical data containers and/or a metadata store of a storage service by emulating the physical tape operations. For example, a virtual tape library appliance is installed at a customer premise location to interface with a client archive system. The virtual tape library appliance provides virtual interfaces to appear as physical tape library subsystems, such as tape drives and media changing interfaces. However, these virtual interfaces are supported by logical data containers in a storage service and a metadata store. The virtual tape library system allows the client archive system to make requests to import new virtual tapes, export virtual tapes for archiving, store virtual tapes at a virtual location, load and eject virtual tapes into a virtual tape drive and operate on virtual tapes in a virtual tape drive.

26 Claims, 19 Drawing Sheets

(56) References Cited

U.S. PATENT DOCUMENTS

| | | | |
|---|---|---|---|
| 6,049,848 A | 4/2000 | Yates et al. | |
| 6,125,468 A | 9/2000 | Kim et al. | |
| 6,732,124 B1 | 5/2004 | Koseki et al. | |
| 7,127,575 B2 * | 10/2006 | Kano | 711/161 |
| 7,698,532 B1 | 4/2010 | Gonzalez | |
| 8,230,187 B1 | 7/2012 | Krinke et al. | |
| 8,935,470 B1 | 1/2015 | Fair | |
| 8,935,493 B1 * | 1/2015 | Dolan | G06F 3/0649 711/117 |
| 2001/0018729 A1 | 8/2001 | Johnson | |
| 2002/0035664 A1 | 3/2002 | Yates et al. | |
| 2002/0169932 A1 | 11/2002 | Burns et al. | |
| 2004/0034811 A1 * | 2/2004 | Trimmer et al. | 714/13 |
| 2004/0085723 A1 | 5/2004 | Hartung | |
| 2005/0193235 A1 | 9/2005 | Sandorfi et al. | |
| 2006/0047905 A1 | 3/2006 | Matze et al. | |
| 2006/0200623 A1 | 9/2006 | Gonzalez et al. | |
| 2007/0198722 A1 | 8/2007 | Kottomtharayil et al. | |
| 2007/0266037 A1 | 11/2007 | Terry et al. | |
| 2008/0034225 A1 | 2/2008 | Johnson | |
| 2008/0082310 A1 * | 4/2008 | Sandorfi et al. | 703/23 |
| 2008/0120482 A1 | 5/2008 | Jarvis et al. | |
| 2008/0222344 A1 * | 9/2008 | Upadhyayula | 711/4 |
| 2008/0250197 A1 | 10/2008 | Daily et al. | |
| 2008/0301363 A1 | 12/2008 | Kitamura et al. | |
| 2009/0037451 A1 | 2/2009 | Borrill | |
| 2009/0077309 A1 | 3/2009 | Slater et al. | |
| 2009/0276588 A1 | 11/2009 | Murase et al. | |
| 2009/0300409 A1 | 12/2009 | Bates et al. | |
| 2009/0323218 A1 | 12/2009 | Thompson et al. | |
| 2010/0100676 A1 | 4/2010 | Johnson et al. | |
| 2010/0180074 A1 | 7/2010 | Slater et al. | |
| 2010/0185813 A1 | 7/2010 | Muroyama | |
| 2010/0306462 A1 | 12/2010 | Otsuka | |
| 2010/0318612 A1 * | 12/2010 | Agarwal | G06Q 10/107 709/206 |
| 2011/0099346 A1 | 4/2011 | Toshine et al. | |
| 2011/0107024 A1 | 5/2011 | Bish et al. | |
| 2011/0145494 A1 * | 6/2011 | Mitsuma | G06F 3/061 711/111 |
| 2011/0145523 A1 | 6/2011 | Gupta et al. | |
| 2011/0320679 A1 | 12/2011 | Ashton et al. | |
| 2012/0166723 A1 | 1/2012 | Araki et al. | |
| 2012/0047338 A1 | 2/2012 | Akirav et al. | |
| 2013/0151023 A1 * | 6/2013 | Taniyama | G06F 3/0625 700/291 |
| 2013/0166960 A1 | 6/2013 | Das et al. | |
| 2013/0173859 A1 * | 7/2013 | Gorrell et al. | 711/112 |
| 2013/0271865 A1 | 10/2013 | Amir et al. | |
| 2014/0052691 A1 | 2/2014 | Sasson et al. | |
| 2014/0181395 A1 * | 6/2014 | Vincent | G06F 11/1456 711/111 |
| 2014/0181396 A1 * | 6/2014 | Vincent | G06F 3/0605 711/111 |

FOREIGN PATENT DOCUMENTS

| | | |
|---|---|---|
| CN | 101739307 | 6/2010 |
| JP | 2005055945 | 3/2005 |
| JP | 2005099971 | 4/2005 |
| JP | 2007293778 | 11/2007 |

OTHER PUBLICATIONS

Notice to Grant for Chinese Application 201380069599.8 dated Dec. 25, 2017, 4 pages.

Japanese Official Notice of Rejection, dated Aug. 15, 2017, for Patent Application No. 2015-549517, 17 pages.

European Notice of Intention to Grant for Patent Application No. 13864506.4 dated Jan. 19, 2018, 150 pages.

Canadian Office Action for Patent Application No. 2,893,594 dated Apr. 12, 2018, 5 pages.

* cited by examiner

VIRTUAL TAPE LIBRARY SYSTEM

CROSS-REFERENCE TO RELATED APPLICATIONS

This application is related to and incorporates by reference for all purposes the full disclosure of co-pending U.S. patent application Ser. No. 13/722,814, filed concurrently herewith, entitled "VIRTUAL TAPE USING A LOGICAL DATA CONTAINER."

BACKGROUND

Organizations back up data in case of data loss or corruption. For example, client data may be under many different threats, including environmental threats, security threats, accidents and/or failures. Environmental dangers include storms or other natural disasters that can disrupt or damage client systems. Security threats include hackers that may maliciously enter a production system and corrupt or destroy data and/or software. Accident threats include such problems as software bugs that corrupt or make inconsistent data. Failure threats include the failure of hardware systems, such as the correlated failure of multiple storage devices that contain critical data. If a backup is present, then at least the data and/or software may be reset back to a known, good point in time.

One method of backing up data is through a tape backup system. A tape backup system uses tape cartridges to store data. In some companies, a tape backup system may be partially or fully automated such that tapes may be moved by robotic arm from a storage location to a tape drive and then back to a storage location. For example, a client archive system sends commands to the robotic system to move tapes from one location to another and tracks the movement of the tapes. The client archive system may also track the information written to the tapes, in order to recall files or other information if needed for a restore operation. These robotic systems may need large rooms and maintenance of the mechanical systems to operate efficiently.

BRIEF DESCRIPTION OF THE DRAWINGS

Various embodiments in accordance with the present disclosure will be described with reference to the drawings, in which.

DETAILED DESCRIPTION

Figure 1:
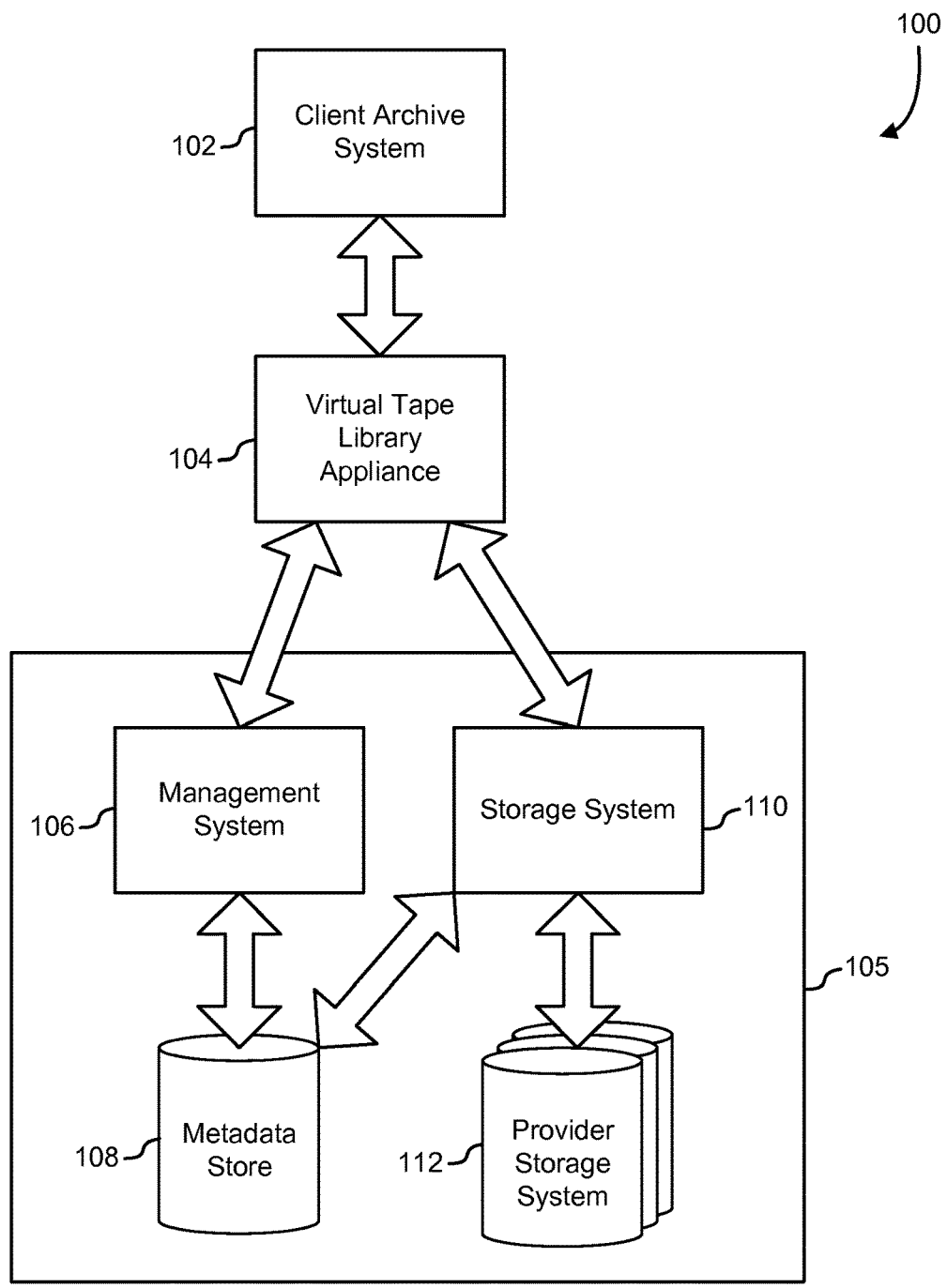
FIG. 1 shows an illustrative example of a virtual tape library in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include implementing a virtual tape library system to back up data from a client archive system expecting physical tape operations onto logical data containers and/or a metadata store of a storage service by emulating the physical tape operations. For example, a virtual tape library appliance is installed at a customer premise location to interface with a client archive system. The virtual tape library emulates a physical tape library such that a client archive system may operate on virtual tapes to archive client data. The virtual tape library appliance provides virtual interfaces to appear as physical tape library subsystems, such as tape drives and media changing interfaces. However, these virtual interfaces are supported by logical data containers in a storage service and a metadata store. The virtual tape library system allows the client archive system to make requests to import new virtual tapes, export virtual tapes for archiving, store virtual tapes at a virtual location, load and eject virtual tapes into a virtual tape drive and operate on virtual tapes in a virtual tape drive.

Operations on a virtual tape in a virtual tape drive may include seeking, reading, writing, initializing, marking and other physical tape operations emulated by the virtual tape library system. These requests for manipulation of tape cartridges by the client archive system are translated by the virtual tape library system to operate on a metadata store and/or logical data containers of a storage service. Movement operations, such as moving a virtual tape from one virtual location to another, may be accomplished by changing an association between the virtual tape and a virtual location in the metadata store. Data operations, such as reading or writing to a virtual tape, may be accomplished through an interface that operates in conjunction with the storage service on the logical data container. The storage service may be an on-demand storage service in which logical data containers are provisioned on an as-needed basis. In some embodiments, the storage service and the virtual tape library appliance may be separated by a public network, such as the Internet. By providing the virtual tape library system, a client may be able to actively manage resources for backup as needed, while reducing the cost required for tape hardware maintenance. For example, virtual tapes may be constructed or deleted on an on-demand basis to match storage needs and costs.

In one embodiment, a client backs up data to a virtual tape and stores the virtual tape in archival storage. A new virtual tape is requested by a client through an active storage provisioning interface. The virtual tape is created by provisioning a new logical data container in the storage service and associating the logical data container with a virtual tape identifier (ID), such as an association in the metadata store. The new virtual tape is then virtually placed in the virtual import/export slot in the virtual tape library. The movement of the virtual tape is accomplished by associating the virtual tape ID with a virtual import/export slot in the metadata store. Once the virtual tape is in the virtual import/export slot, the client archive system may assume control of the virtual tape. The client archive system may then request the virtual tape be moved to a virtual tape drive through a virtual media changer of the virtual tape library system. This movement may be accomplished by removing the association of the virtual tape ID with the virtual import/export slot and associating the virtual tape ID with a virtual tape drive. A virtual tape drive interface, such as Internet Small Computer System Interface (iSCSI), associated with the specific virtual tape drive selected may be assigned to the logical data container associated with the virtual tape ID. The new virtual tape may then be initialized, which may include writing a basic virtual tape structure, such as a global header, to the logical data container. After initialization, the client systems may back up data through the client archive system to the virtual tape. The backing up of data may be accomplished by the virtual tape library appliance receiving tape commands and translating the tape commands to operations that operate on a virtual tape structure on the logical data container assigned to the virtual tape drive in the storage service. These operations may include writing data, making records and making file marks. After the backup is complete, the client archive system may request the virtual tape be moved from the virtual tape drive to the virtual import/export slot for archival storage. In response, the virtual tape library appliance may cause the association of the virtual tape drive and the virtual tape ID to be removed, as well as the assignment of the virtual tape drive interface to the logical data container. The logical data container may then be staged for transfer to an archival service from the active storage of the storage service.

In another embodiment, a client restores data from a virtual tape in archival storage. The client may request the virtual tape be transferred from archival storage to a virtual import/export slot through a provider storage system. In response, the provider may transfer the logical data container associated with the virtual tape from archival storage to active storage. Upon completion of the transfer, the virtual tape library system may associate the virtual tape ID with the virtual import/export slot. Once the virtual tape is in the virtual import/export slot, the client archive system may assume control of the virtual tape. The client archive system may then request the virtual tape be moved to a virtual tape drive through a virtual media changer of the virtual tape library system. This movement may be accomplished by removing the association of the virtual tape ID with the virtual import/export slot and associating the virtual tape ID with a virtual tape drive. A virtual tape drive interface associated with the specific virtual tape drive selected may be assigned to the logical data container associated with the virtual tape ID. The client archive system may then perform operations on the virtual tape, such as locate, space, read or other tape operations. These operations may then be used to determine which data to retrieve from the logical data container. After the restore is complete, the client archive system may request the virtual tape be moved from the virtual tape drive to the virtual import/export slot for archival storage or to a virtual tape slot location to await further action. In response, the virtual tape library appliance may cause the association of the virtual tape drive and the virtual tape ID to be removed, as well as the assignment of the virtual tape drive interface to the logical data container. In the case of re-archival, the logical data container may then be staged for transfer to an archival service from the active storage of the storage service. In the case of a virtual tape slot location, an association between the virtual tape ID and a virtual tape slot location may be stored.

In other embodiments, virtual tapes may be reinitialized or destroyed. In reinitialization, a virtual tape is erased of its current data. The client archive system may request that a virtual tape be loaded in a virtual tape drive through a virtual media changer. As discussed above, as a result of the request to load the virtual tape, a logical data container associated with the virtual tape may become associated with an interface to a virtual tape drive. The client archive system may then request the virtual tape drive reinitialize the virtual tape. In some embodiments, this reinitialization may be accomplished by changing a generation identifier in the global header of the logical data container to invalidate all data within the logical data container. After reinitialization, the client archive system may use the virtual tape or request the tape be moved back to a virtual tape slot location to await use. The client archive system may also request that tapes be destroyed. The client archive system may request the virtual tape be moved from the virtual tape drive to the virtual import/export slot for destruction. In response, the virtual tape library appliance may cause the association of the virtual tape drive and the virtual tape ID to be removed, as well as the assignment of the virtual tape drive interface to the logical data container. The logical data container may then be deprovisioned.

An advantage of the current system is that a cost of use may scale to the actual usage of the system. For example, a client may use hourly, daily, weekly, monthly, annual and other time spans between backups to virtual tape. After one week, a client may wish to destroy all hourly backups except a midnight backup to represent a daily backup. Destruction of the remaining hourly backups results in no further cost for the destroyed virtual tapes.

A storage service may provide multiple tiers of storage that may be used to store virtual tapes. The storage service may use varying storage systems including object storage or block storage. In one embodiment, an active storage and archival storage may be used. The active storage may provide a response that is adequate for reading and writing of data. The archival service may provide service with too high of a latency that makes it inadequate to read or write, but adequate for longer term storage. For example, an active storage logical data container may provide synchronous read and write responses, such as confirmations or data from the read or write. An archival storage logical data container may provide asynchronous responses, such as a job identifier for each request. The job identifier may then be queried to determine if the job has completed. Both logical data containers may also include data objects of varying size that include one or more logical data containers. In use, when a virtual tape is placed in the virtual import/export slot, the logical data container behind the virtual tape may be staged for transfer between the active storage and archival storage.

In another embodiment, a three tiered storage may be used. The three tiered storage may be viewed in terms of how long a logical data container associated with a virtual tape would need to be ready for data transfer. For example, three logical data containers may be stored in locations of the virtual library. The first logical data container may be stored in a first tier that is ready to be accessed. When the client archive system requests the virtual tape associated with the first logical data container be loaded in the virtual tape drive, the logical data container may be ready once the virtual tape drive interface becomes associated with the logical data container. A second logical data container may be stored in a second tier that may be ready to access in minutes. When the client archive system requests the virtual tape associated with the second logical data container be loaded in the virtual tape drive, the second logical data container may be transferred to a higher storage tier before the virtual tape is ready to receive data. The second logical data container may be made available in minutes due to the moderate performance of the storage tier. A third logical data container may be stored in a third tier that may be ready to access in hours or more. When the client archive system requests the virtual tape associated with the third logical data container be loaded in the virtual tape drive, the third logical data container may be transferred to a higher storage tier before the virtual tape is ready to receive data. The third logical data container may be made available in hours or more, due to the low performance of the storage tier. In some embodiments, the second or third logical data containers may be routed through a virtual import/export slot rather than the virtual library storage location. An advantage of the multiple tier structure is that a client may decide its needs for availability of the backup data. Long term storage may be more cheaply stored with a longer response time, while active data may be readily available with a more expensive cost.

The term provisioning is meant to be read broadly to include the assignment of a computing resource to a use. In some embodiments, this includes preparing the computing resource for use. In one embodiment, a provisioning of a resource would include the assignment of a server, installation of an operating system, installation and configuration of the software to be placed on the resource and enabling the constructed resource for use. For example, a provisioning system may select a server to use as a database for a metadata store. The provisioning system may then create a workflow that prepares the server for use as a database. As part of the workflow, a machine image may be loaded on the server. The machine image may include operation system, database software and/or settings. After loading the machine image, the server may be caused to boot into the operating system and receive any further software and/or settings. Such settings may include a domain name and/or initial metadata and security configuration. After provisioning is complete, the server may be turned over to a management system for use as a metadata store and inclusion in the virtual tape library system.

Turning now to FIG. 1, an illustrative example of a virtual tape library 100 in accordance with at least one embodiment is shown. In the embodiment shown, a client archive system 102 may communicate with a virtual tape library appliance 104 such that the client archive system 102 may use a storage service 105 rather than physical tape media. A client archive system 102 may be configured to operate with physical tape media. A virtual tape library appliance 104 may be connected to the client archive system 102 to emulate a physical tape library using a storage service 105. The virtual tape library appliance 104 may receive commands that are translated to operations in the storage service 105, such as creating associations between virtual constructs in a metadata store 108 or storing data in a virtual tape structure in a provider storage system 112 through communication with a storage system 110, such as application programming interface (API) calls. The virtual tape library appliance 104 may also request management tasks from a management system 106, such as creating or destroying logical data containers.

For example, a client archive system 102 may seek information from a logical data container. The client archive system 102 may send a request to the virtual tape library appliance 104 to load a virtual tape into a virtual tape drive. The virtual tape library appliance 104 may request the metadata store 108 return a logical data container identifier associated with the virtual tape ID. The virtual tape library appliance 104 may then create an association between the logical data container and the virtual tape drive. An interface assigned to the virtual tape drive may also be directed to the logical data container. Using a virtual tape structure of the logical data container, the virtual tape library appliance 104 may translate requests to operate on the logical data container. The requests may include reading from an identified record. After the use of the virtual tape is complete, the client archive system 102 may request the virtual tape be moved from the virtual tape drive to a virtual library location to await further action. In response, the virtual tape library appliance 104 may cause the removal of the association between the virtual tape drive and the virtual tape ID and between the assignment of the virtual tape drive interface to the logical data container.

Figure 2:
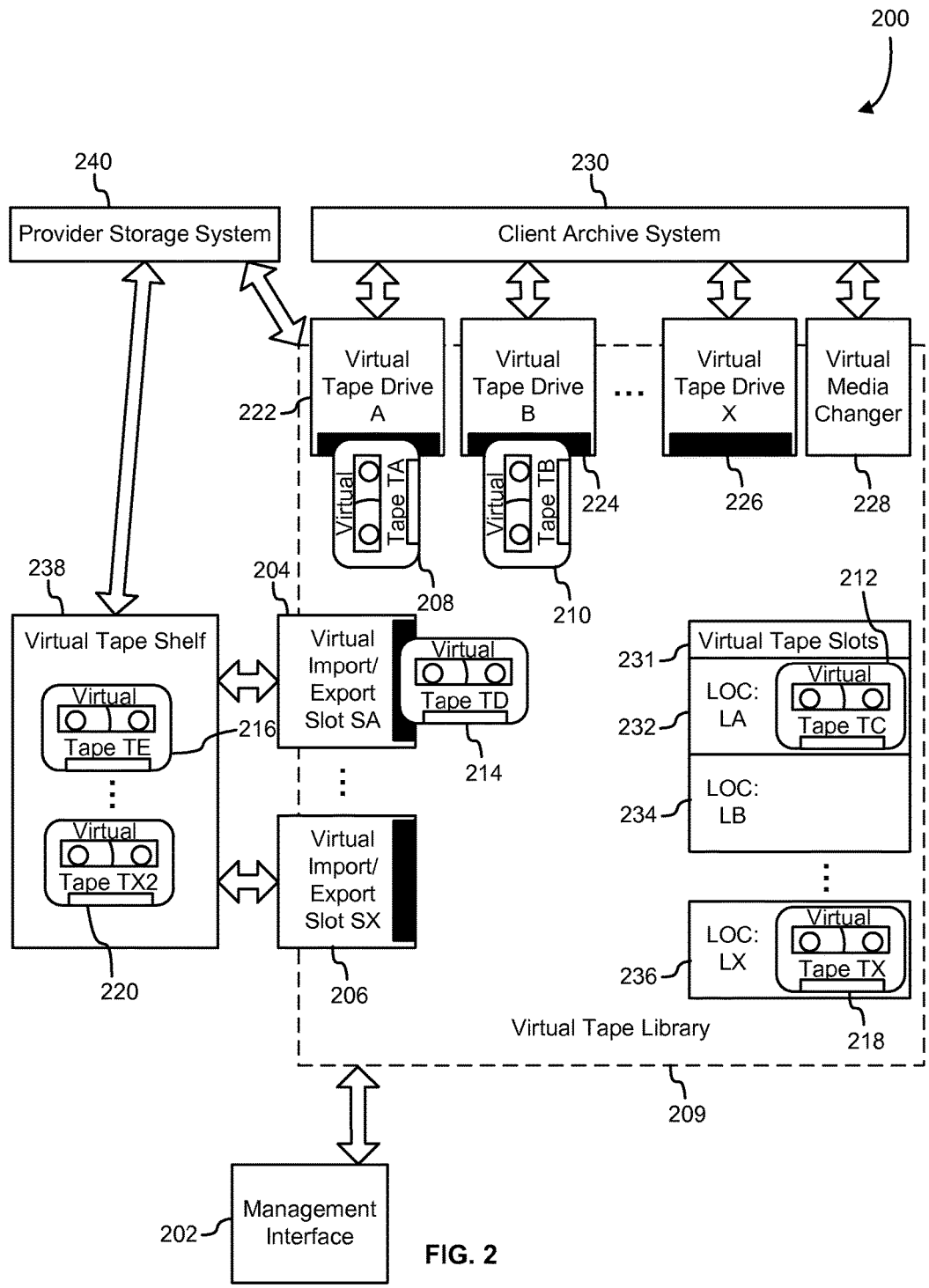
FIG. 2 shows an illustrative example of a virtual tape library system in accordance with at least one embodiment.
Figure 3:
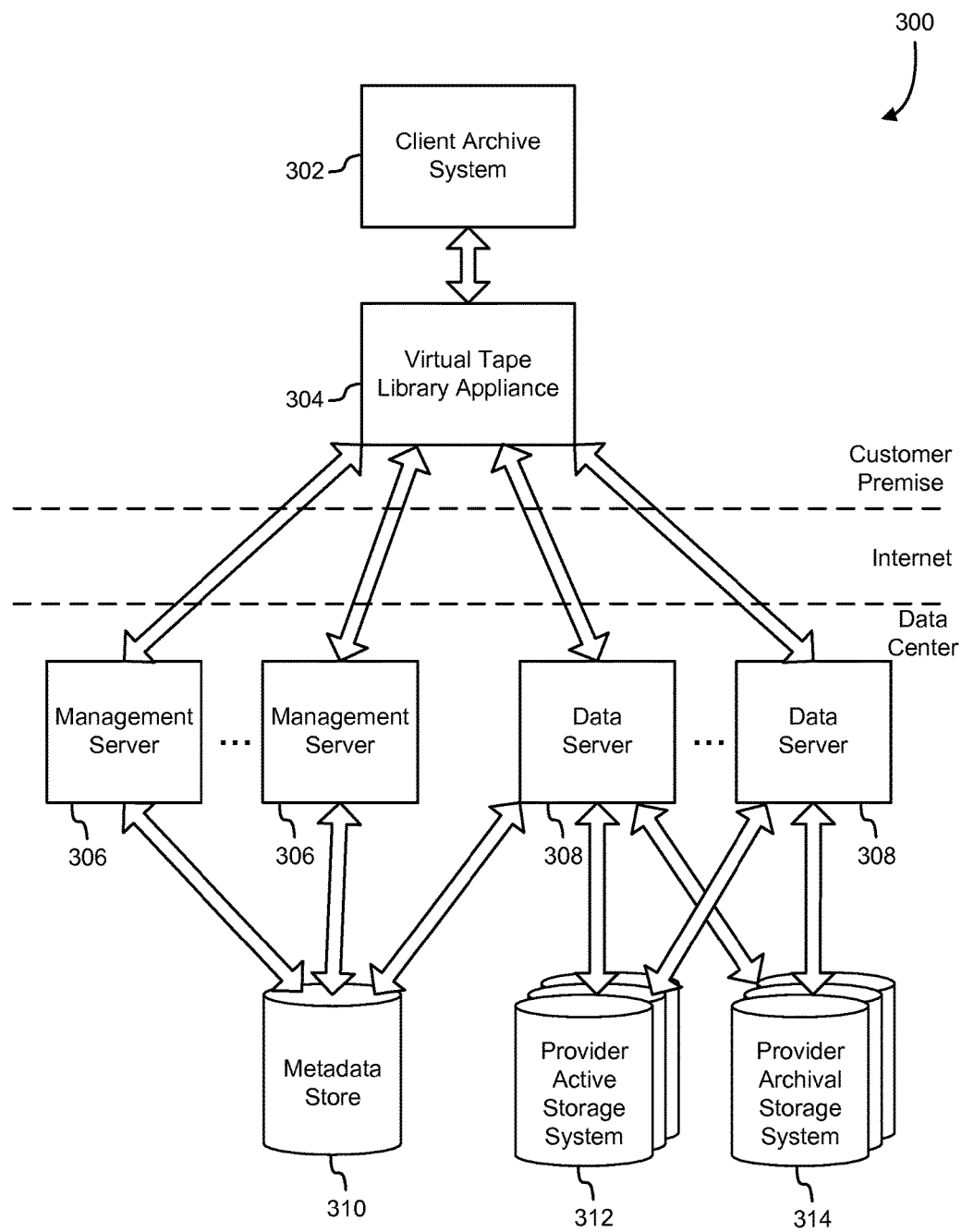
FIG. 3 shows an illustrative example of a virtual tape library system in accordance with at least one embodiment.
Figure 4:
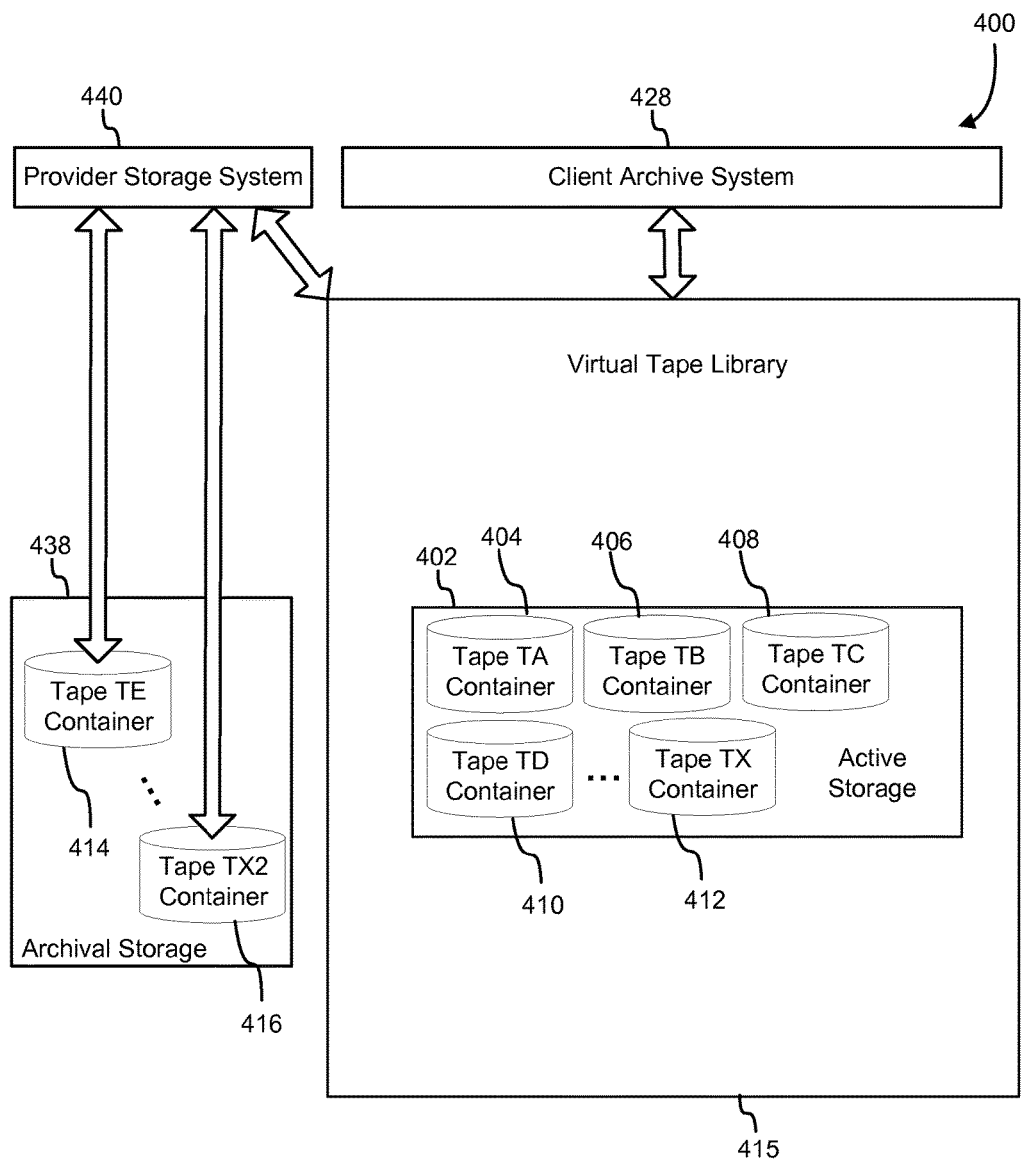
FIG. 4 shows an illustrative example of a virtual tape library system in accordance with at least one embodiment.

Turning now to FIGS. 2 to 4, a virtual embodiment of infrastructure of a virtual tape library system 200 is shown and a physical embodiment of infrastructure of the virtual tape library 300 is shown. An example mapping 400 of logical data containers in FIG. 3 to virtual locations in FIG. 2 may be seen in FIG. 4 as represented in a data store from FIG. 3. In one embodiment, a client archive system expects to interface with a physical tape storage system. In place of the physical system, however, a virtual tape library system provides virtual versions of expected physical systems, such as a virtual media changer 228, virtual tape drives 222, 224 and 226, virtual import/export slots 204 and 206, virtual tape slots 231 with virtual tape slot locations 232, 234 and 236 and other virtual tape systems as seen in FIG. 2. A virtual tape library appliance 304 provides the interface to the client archive system 302 to provide these virtual systems through use of storage in provider storage systems 312 and 314 and a metadata store 310 as seen in FIG. 3. The provider storage systems 312 and 314 provide storage space for virtual tapes through a virtual tape structure that aids in responding to tape commands. The metadata store provides associations between virtual tapes, logical data containers and locations in the virtual tape library. A client archive system may request changes to location through a virtual media changer 228. These associations may include entries in the metadata store for "location," "logical data container ID," and "virtual tape ID." For example, a client may request through the virtual media changer 228 that a virtual tape 214 be moved from a virtual import/export slot 204 to a virtual tape drive 226. In response, a logical data container in a provider active storage system 312 representing a virtual tape 214 may remain physically in the same space, while the virtual tape 214 may be virtually moved from the virtual import/export slot 204 to the virtual tape drive 226 by changing a "location" value of the virtual tape 214 in the metadata store 310. The virtual tape library appliance provides interfaces, such as virtual tape drives and a virtual media changer, to translate requests from the client archive system to the metadata store or provider storage systems 312 and 314. For example, a virtual tape drive 222 interface may remain the same, but data may be redirected from the interface to a logical data container currently associated with the virtual tape drive in the metadata store 310. Through use of these virtual systems, a client may create virtual tapes, backup data to virtual tapes, restore data from virtual tapes, store virtual tapes and destroy virtual tapes.

In one embodiment, a client may create a virtual tape. In a physical tape system, physical tapes are not created on-demand, but inserted into the physical tape system. However, in the virtual tape library system 200 of FIG. 2, virtual tapes may be created on demand by requesting a new virtual tape be created from management system 202. This active management system 202 in FIG. 2 may be a part of the virtual tape library appliance 304 or management server 306 of FIG. 3. In an embodiment, the client archive system 302 may not have a method for requesting a new virtual tape and the new virtual tape may need to be requested externally from the client archive system 302 in FIG. 3, such as through a management console. The request may result in a data server 308 provisioning a new active logical data container in a provider active storage system 312 for use as a virtual tape. The client archive system 302 may provide a virtual tape ID to associate with the new logical data container. The virtual tape library appliance 304 may cause the virtual tape ID to be associated with the new active storage logical data container in a metadata store 310. After provisioning the new active storage logical data container, the virtual tape library appliance 304 may cause the metadata store 310 to also associate the new active storage logical data container in FIG. 3 with a virtual import/export slot 204 in FIG. 2. When the virtual tape 214 is associated with the virtual import/export slot 204 in FIG. 2, the client archive system 230 may then move the virtual tape 214 to another location, such as slot location 234 or to a virtual tape drive, such as virtual tape drive 226.

In another embodiment, a client may back up data to a virtual tape. The client archive system 230 may request that a virtual tape 208 be moved from a location, such as virtual tape slot location 234 in virtual tape library 231, to a virtual tape drive 222 as seen in the virtual tape library 209 of FIG. 2. The movement of the virtual tape 214 may be represented by a change in a "location" entry for the virtual tape 214 in the metadata store 310 in FIG. 3 from virtual tape slot location 234 to virtual tape drive 226. A virtual tape drive interface provided by the virtual tape library appliance 304 to the client archive system 302 may be directed to the active storage logical data container associated in the metadata store 310 in FIG. 3 with the virtual tape 214 in FIG. 2. The backing up of data from the client archive system 302 may be accomplished by the virtual tape library appliance 304 receiving tape commands and translating the tape commands to operations that operate on a virtual tape structure on the active storage logical data container in the provider active storage system 312 in FIG. 3 assigned to the virtual tape drive 222 in FIG. 2. These operations may include writing data, making records and making file marks. After the backup is complete, the client archive system 230 may request the virtual tape be moved from the virtual tape drive to another location, such as back to virtual tape slot location 234 in FIG. 2

In some embodiments, a client may restore data from a virtual tape. The client archive system 230 may request through a virtual media changer 228 that a virtual tape 208 be moved from a location, such as virtual import/export slot 206, to a virtual tape drive 222 as seen in FIG. 2. The movement of the virtual tape 214 may be represented by a change in a "location" entry for the virtual tape 214 in the metadata store 310 in FIG. 3 from virtual tape slot location 234 to virtual tape drive 226. A virtual tape drive interface provided by the virtual tape library appliance 304 to the client archive system 302 may be directed to the active storage logical data container associated in the metadata store 310 in FIG. 3 with the virtual tape 214 in FIG. 2. The client archive system 230 may then perform operations on the virtual tape 214, such as locate, space, read or other tape operations. These operations may then be used to determine which data to retrieve from the active storage logical data container in FIG. 3. After the restore is complete, the client archive system 230 in FIG. 2 may request the virtual tape 214 be moved from the virtual tape drive 222 to a virtual import/export slot 206 for archival storage or to a virtual tape slot location 234 to await further action.

In one embodiment, a client may store a virtual tape. The client archive system 230 in FIG. 2 may request that a virtual tape 208 be moved from a location, such as virtual tape drive 222, to a virtual import/export slot 206 as represented in a metadata store 310. The client may then request through a provider storage system 240 to archive the virtual tape 208 in virtual import/export slot 206. The virtual tape 208 may then be removed from the virtual tape library 209. In FIG. 3, the movement may cause a provider active storage system 312 to stage an active storage logical data container for transfer to a provider archival storage system 314 as an archival storage logical data container by data servers 308. Once complete, the archival storage logical data container may be associated in the metadata store 310 with a location in a virtual tape shelf 238 in FIG. 2. In some embodiments, the virtual tape shelf 238 and virtual tapes 216 and 220 within the shelf 238 are not directly accessible to the client archival system 230. The process may be reversed, such that an archival storage logical data container in a provider archival storage system 314 may be transferred to an active storage logical data container in a provider active storage system 312 in FIG. 3 by a request to a provider storage system 240 in FIG. 2. Once the transfer is complete, the active storage logical data container in FIG. 3 and a virtual tape 214 in FIG. 2 may be associated with a virtual import/export slot 204 in FIG. 2.

In an embodiment, there may be multiple tiers of storage that may be used for logical data containers that support virtual tapes. In some embodiments, as those described above, there may be two tiers, such as provider active storage systems 312 and provider archive storage systems 314 in FIG. 3. As the archive storage logical data containers in provider archival storage systems 314 may not have adequate response time and/or may act asynchronously, virtual tapes 216 and 220 may be represented as being located on a virtual tape shelf 238 with long response times as seen in FIG. 2. A third tier of storage with a smaller response time than the archival storage logical data container, but longer response time than the active storage logical data container, may be represented as locations in a virtual library 221. As the client archive system 230 may be tolerant of requests to load a virtual tape 212 into a virtual tape drive 226 in FIG. 2 that takes minutes, a logical data container in the third storage tier may be transferred to a higher storage tier, such as to an active storage logical data container in FIG. 3 and associated with a virtual tape drive 226 in FIG. 2. This third tier may allow the client to have a smaller cost for storage that is quickly available, but less expensive than readily available.

In another embodiment, a client may destroy a virtual tape. In FIG. 2, a virtual tape 214 may be virtually moved to a virtual import/export slot 204. In FIG. 3, this virtual movement may be accomplished through an association in a metadata store 310 of a virtual tape ID with a location and an active storage logical data container. The virtual tape 214 in FIG. 2 may then be removed from the virtual tape library 209 by removing location information from the metadata store 310 in FIG. 3. The active storage logical data container associated with the virtual tape 214 may then be deprovisioned by a data server 308. Depending on the embodiment and the client archive system 302, the metadata store 310 may or may not delete the entry for the virtual tape 214.

It should be noted that in some embodiments, such as the one shown in FIG. 3, the virtual tape library appliance 304 may be installed at a customer location. The customer location may be separated by a public network, such as the Internet, from a data center housing the management servers 306 and data servers 308 responsible for the metadata store 310 and active storage logical data container.

In FIG. 4, a mapping of virtual locations stored in a metadata store to physical logical data containers in the data center is shown. Mappings, provided by the metadata store 310 in FIG. 3, are shown being contained by virtual locations in FIG. 4. Virtual mappings of virtual tapes 208, 210, 212, 214, 216, 218 and 220 correspond to mappings of logical data containers 404, 406, 408, 410, 412, 414 and 416. The virtual tape library 415 interacts with the active storage 402 through the provider storage system 440. Logical data containers in the archival storage 438 may also be interacted with through the provider storage system 440. Logical data containers may be transferred between the archival storage 438 and active storage 402 through the provider storage system 440. Logical data containers in active storage 402 may be seen as available to the virtual tape library 415 and the client archive system 428. In some embodiments, volumes in archival storage 438 may be seen as unavailable until moved to active storage 402.

Figure 5:
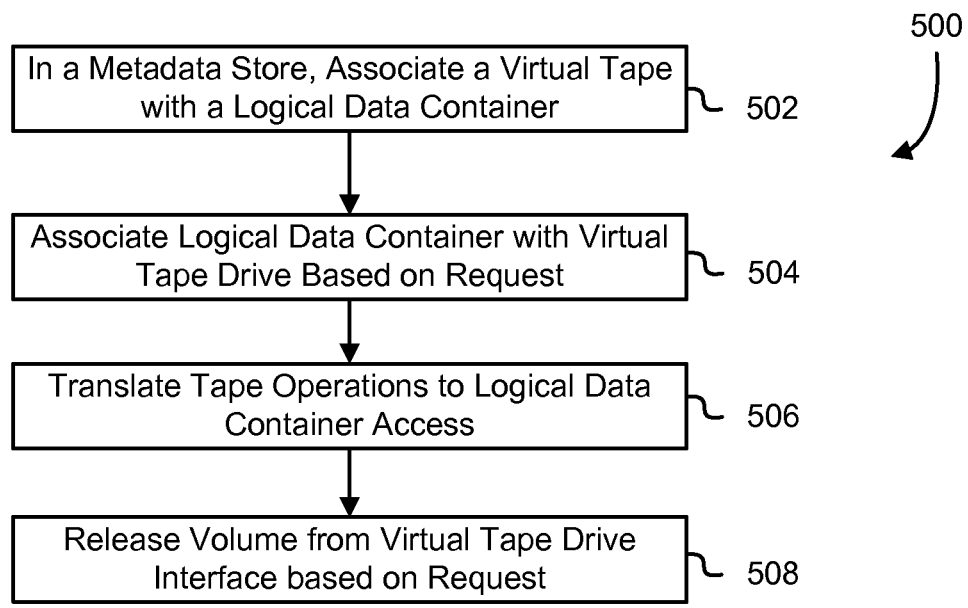
FIG. 5 shows an illustrative example of a process that may be used to operate a virtual tape library system in accordance with at least one embodiment.

Turning now to FIG. 5, an illustrative example of a process 500 that may be used to operate a virtual tape library system in accordance with at least one embodiment is shown. This process 500 may be accomplished collectively by appropriate computing resources such as those shown in FIG. 3, including a client archive system 302, virtual tape library appliance 304, management servers 306, data servers 308, metadata store 310, provider active storage systems 312 and provider archive storage system 314. A virtual tape may be created by storing 502 an association in a metadata store between the virtual tape and a logical data container. The virtual tape may then be associated 504 with a virtual tape drive. Associating the virtual tape with the virtual tape drive may be performed in any suitable manner, such as by a metadata store, as described above in connection with FIG. 3. The virtual tape drive association may instigate an I/O path between a client archive system and the logical data container. The virtual tape library appliance may translate 506 tape operations requested by the client archive system to accesses to the logical data container associated with the virtual tape loaded in the virtual tape drive. For example, a seek operation requesting the fourth record from the beginning of tape (BOT) may be translated to a logical data container request for global record flags metadata in the global header of the logical data container to scan for the fourth record flag set to true. The location of the fourth record flag set to true may then be used calculate the record location in the logical data container and set a tape head location in a journal in the global header to the record location. After the tape operations requested by the client archive system are completed, the virtual tape may be moved from the virtual tape drive another location in the virtual tape library. By moving the virtual tape, the logical data container may be released 508 from the virtual tape drive I/O interface. For example, a request to move the virtual tape to a different location may cause the association of the virtual tape and the virtual tape drive may be removed from the metadata store. A routing of I/O requests by the virtual tape drive I/O interface may also be removed, such that no further I/O requests are routed to the logical data container associated with the virtual tape.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
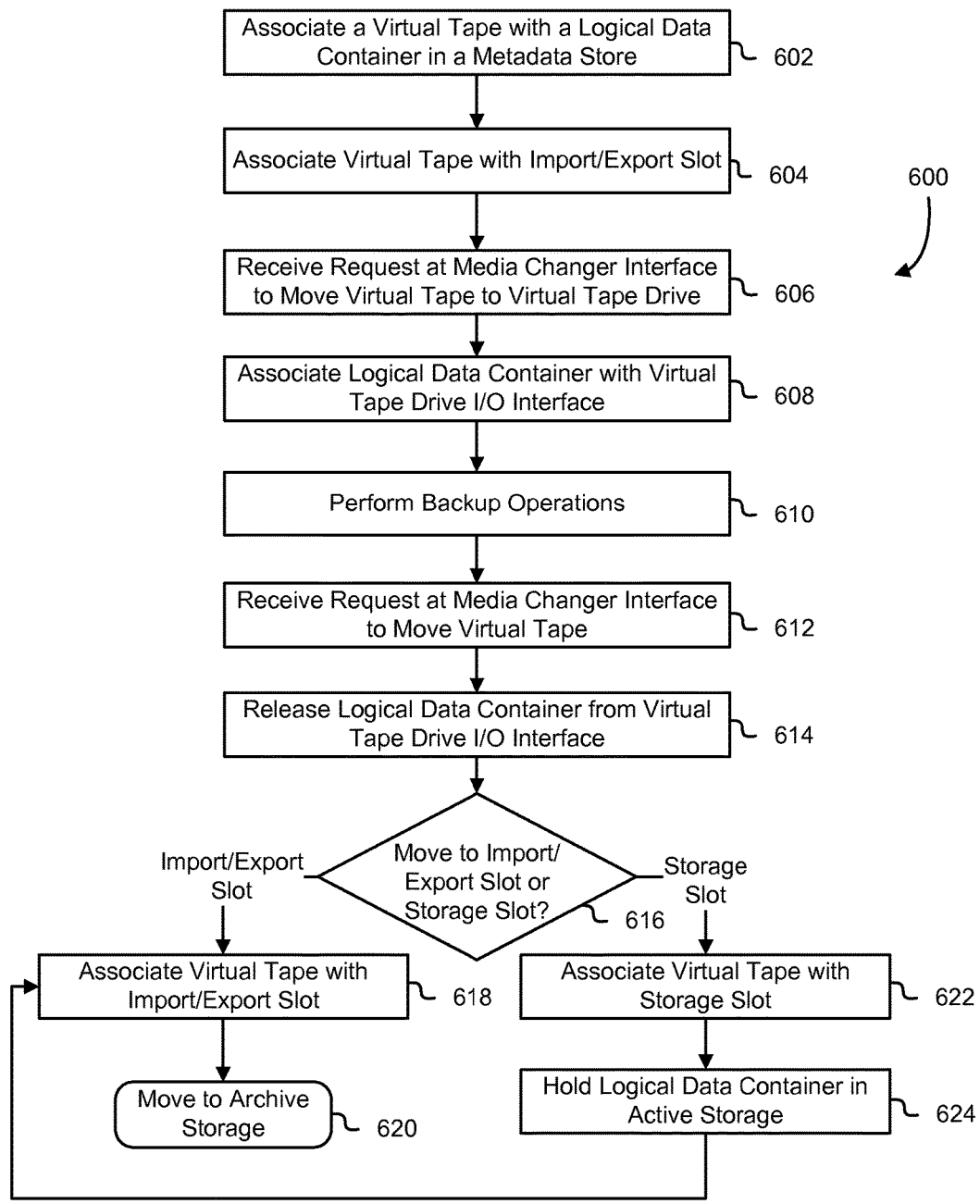
FIG. 6 shows an illustrative example of a process that may be used to back up to a virtual tape library system in accordance with at least one embodiment.

FIG. 6 shows an illustrative example of a process that may be used to back up to a virtual tape library system in accordance with at least one embodiment. This process 600 may be accomplished collectively by computing resources such as those shown in FIG. 3, including a client archive system 302, virtual tape library appliance 304, management servers 306, data servers 308, metadata store 310, provider active storage systems 312 and provider archive storage system 314. A virtual tape may be created by associating 602 the virtual tape with a logical data container in a metadata store. The virtual tape may then be virtually loaded in a virtual import/export slot by associating 604 the virtual tape with the virtual import/export slot in the metadata store. The virtual tape library appliance may receive 606 a request through a media changer interface to move a virtual tape to a virtual tape drive. In response to this request, a logical data container associated with the virtual tape may also be associated 608 with a virtual tape drive I/O interface of the virtual tape drive. The client archive system may then perform 610 backup operations, which may include initializing the logical data container if not yet initialized. After backing up data, the media changer interface may receive 612 a request from the client archive system to move the virtual tape from the virtual tape drive. In response to this request, the logical data container may be released 614 from the virtual tape drive I/O interface. If the logical data container is to be moved 616 to the import/export slot, the virtual tape may be moved to a virtual import/export slot, causing an association 618 with the logical data container, virtual import/export slot and virtual tape in the metadata store. The virtual tape may then be removed from the virtual tape library by moving the virtual tape to a virtual tape shelf. The logical data container may then be staged for and transferred to 620 archival storage. However, if the virtual tape is to be moved 616 to the storage slot such that it remains readily available, the virtual tape may be associated 622 with a library location in the metadata store and held 624 in active storage. After holding in active storage, the virtual tape library appliance may receive a request to send the logical data container to archival storage. The virtual tape may then be associated with the import/export slot 618 and moved 620 to archival storage. In some embodiments, the request is implied by associating the virtual tape with the import/export slot.

Figure 7:
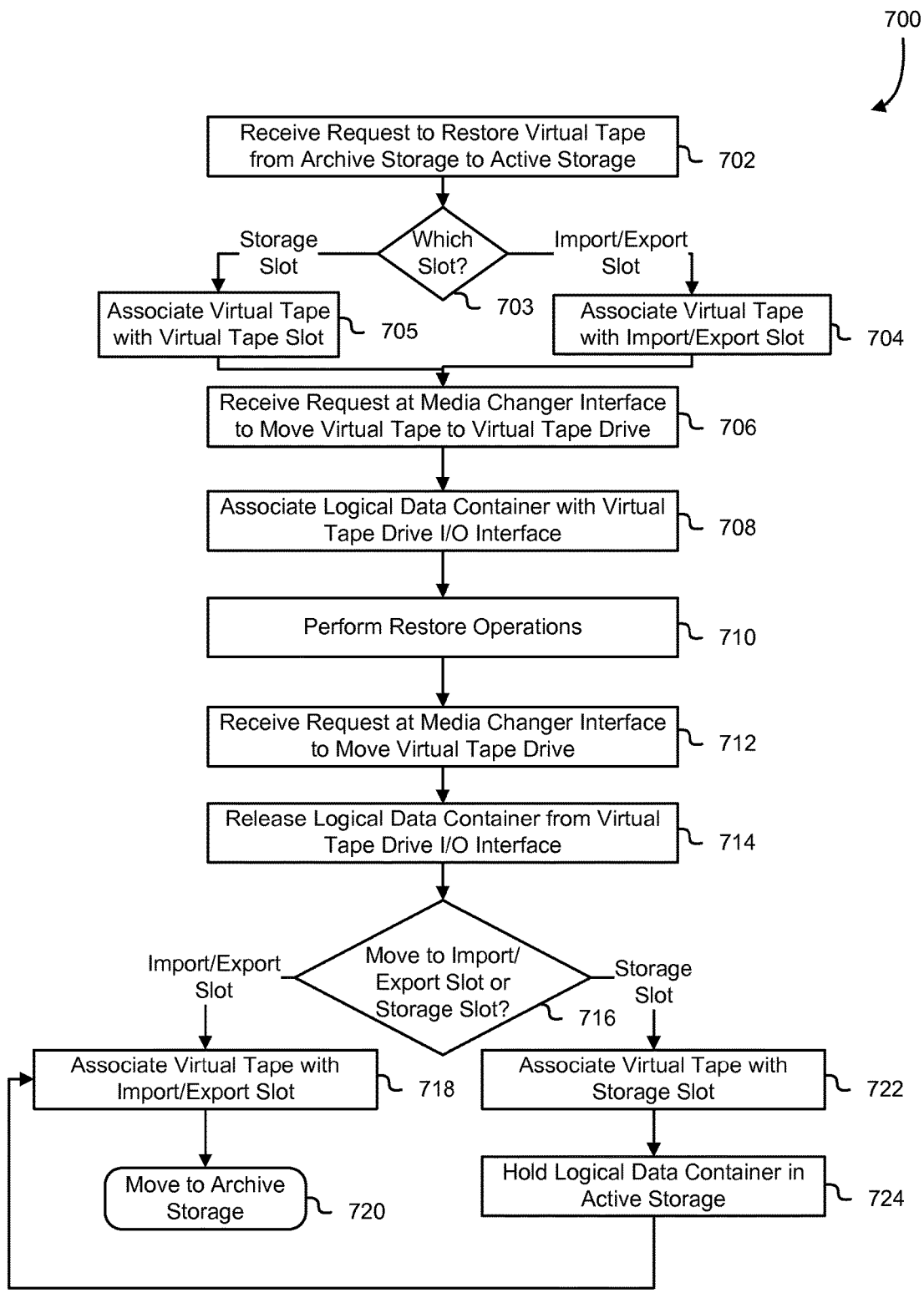
FIG. 7 shows an illustrative example of a process that may be used to restore from a virtual tape library system in accordance with at least one embodiment.

Similar steps may be performed to prepare a virtual tape to restore to the client archive system as seen in FIG. 7. A client may receive a request to restore a virtual tape from archive storage to active storage 702. The client may decide 703 which slot to which the virtual tape may be virtually placed. The virtual tape may be imported into a virtual tape slot 705 or imported into a virtual import/export slot 704. The virtual tape may be loaded 706 in the virtual tape drive and associated 708 a logical data container backing the virtual tape with the virtual tape dive I/O interface. The client archive system may then perform restore operations 710 on the virtual tape, such as locate, space, read or other tape operations. These operations may then be used to determine which data to retrieve from the logical data container. After the restore is complete, the client archive system may request 712 the virtual tape be moved 718 from the virtual tape drive to the virtual import/export slot and released 714 from the virtual tape drive I/O interface for archival storage 720 or to a virtual library location 722 to hold in active storage 724 until a request to archive the logical data container is received. After the request, the virtual tape be moved 718 from the virtual tape drive to the virtual import/export slot and sent to archival storage 720. In some embodiments, the request is implied by associating the virtual tape with the import/export slot.

Figure 8:
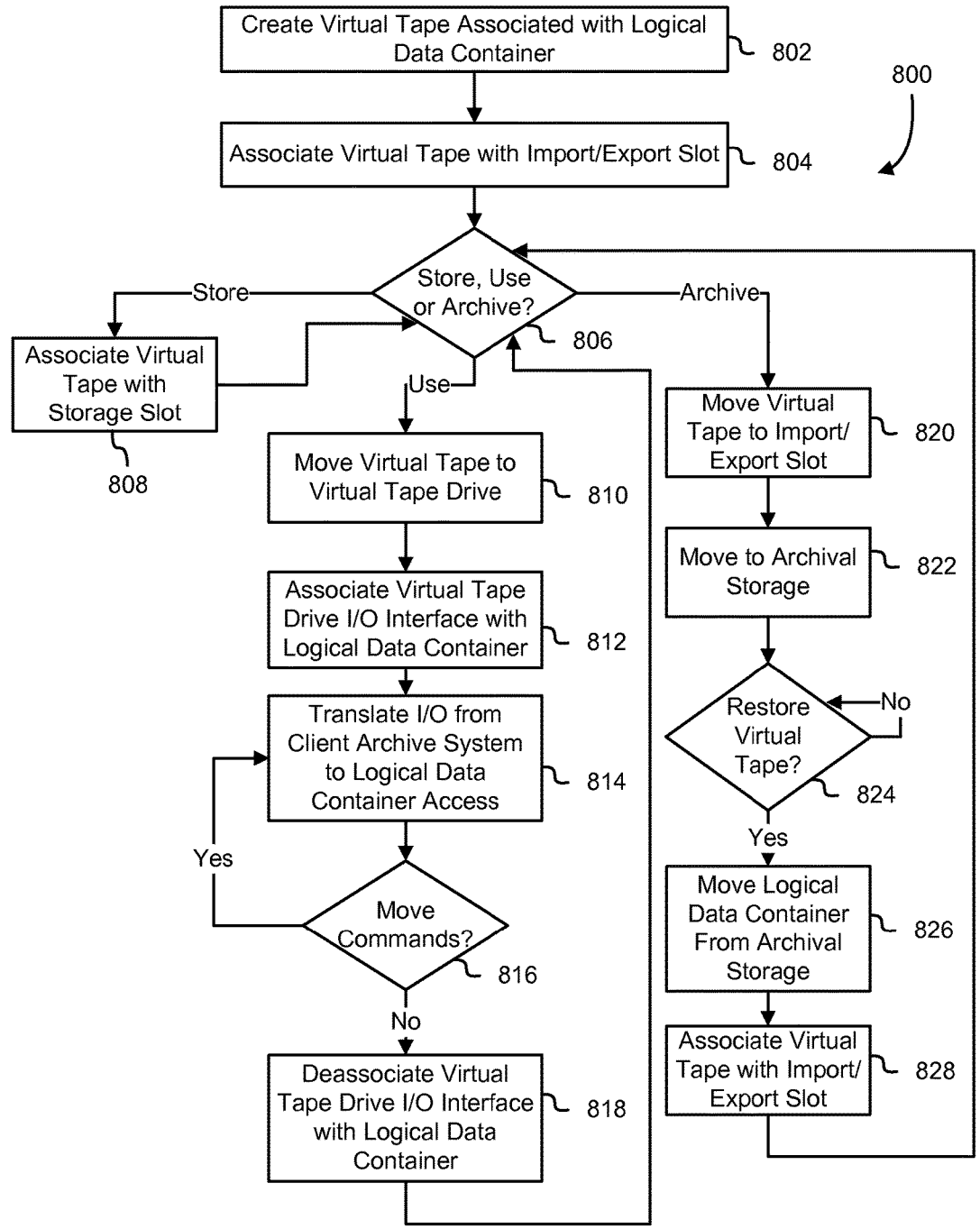
FIG. 8 shows an illustrative example of a process that may be used to operate a virtual tape library system in accordance with at least one embodiment.

Turning now to FIG. 8, an illustrative example of a process 800 that may be used to operate a virtual tape library system in accordance with at least one embodiment is shown. This process 800 may be accomplished by computing resources such as those shown in FIG. 3, including a client archive system 302, virtual tape library appliance 304, management servers 306, data servers 308, metadata store 310, provider active storage systems 312 and provider archive storage system 314. A new virtual tape may be created 802 by provisioning a logical data container in a storage service and associating the logical data container with a virtual tape in a metadata store. The virtual tape may then be associated 804 with a virtual import/export slot in the metadata store. Now that the virtual tape is available to the client archive system, the client archive system may decide whether 806 to store, archive or use the virtual tape. After creation of a new tape, the client archive system may request the tape be used for backup. The client archive system may request the virtual tape be moved 810 to a virtual tape drive through a media changing interface. This virtual move causes the metadata store to associate 812 a logical data container associated with the virtual tape with a virtual tape drive I/O interface. The virtual tape library appliance may then translate 814 tape I/O commands from the client archive system to logical data container access commands. As long as the client archive system sends 816 commands, the virtual tape library appliance may continue to translate the commands for the logical data container. After the client archive system commands are complete 816, the virtual tape and corresponding logical data container may be dissociated 818 with the virtual tape drive I/O Interface. The client archive system may then return to deciding whether 806 to archive, use or store the virtual tape. If the virtual tape is to be stored 806, the virtual tape may be associated with a virtual library location 808 to await further action to be used, stored or archived 806.

If the virtual tape is selected 806 to be archived, the virtual tape may be moved to a virtual import/export slot 820. The virtual tape may then be removed from the virtual library to a virtual library shelf and the logical data container associated with the virtual tape moved 822 to archival storage. The logical data container may stay in archival storage until the virtual tape and/or logical data container is requested to be restored 824 back into the virtual tape library and the associated active storage. Once the logical data container is moved 826 from archival storage, the virtual tape may be associated 828 with a virtual import/export slot in the virtual tape library. The virtual tape may then be stored, used or archived 806.

Figure 9:
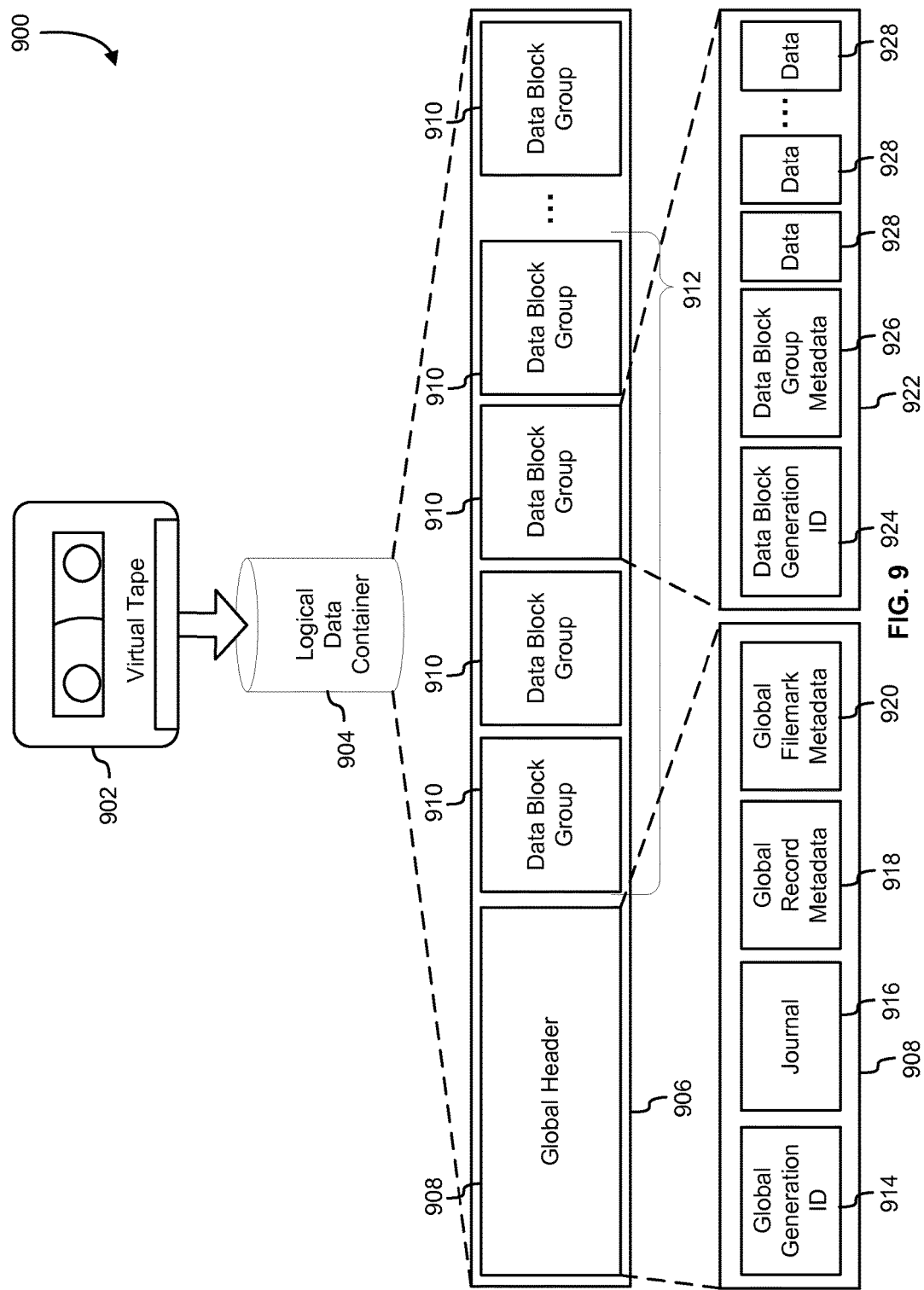
FIG. 9 shows an illustrative example of a virtual tape in accordance with at least one embodiment.
Figure 10:
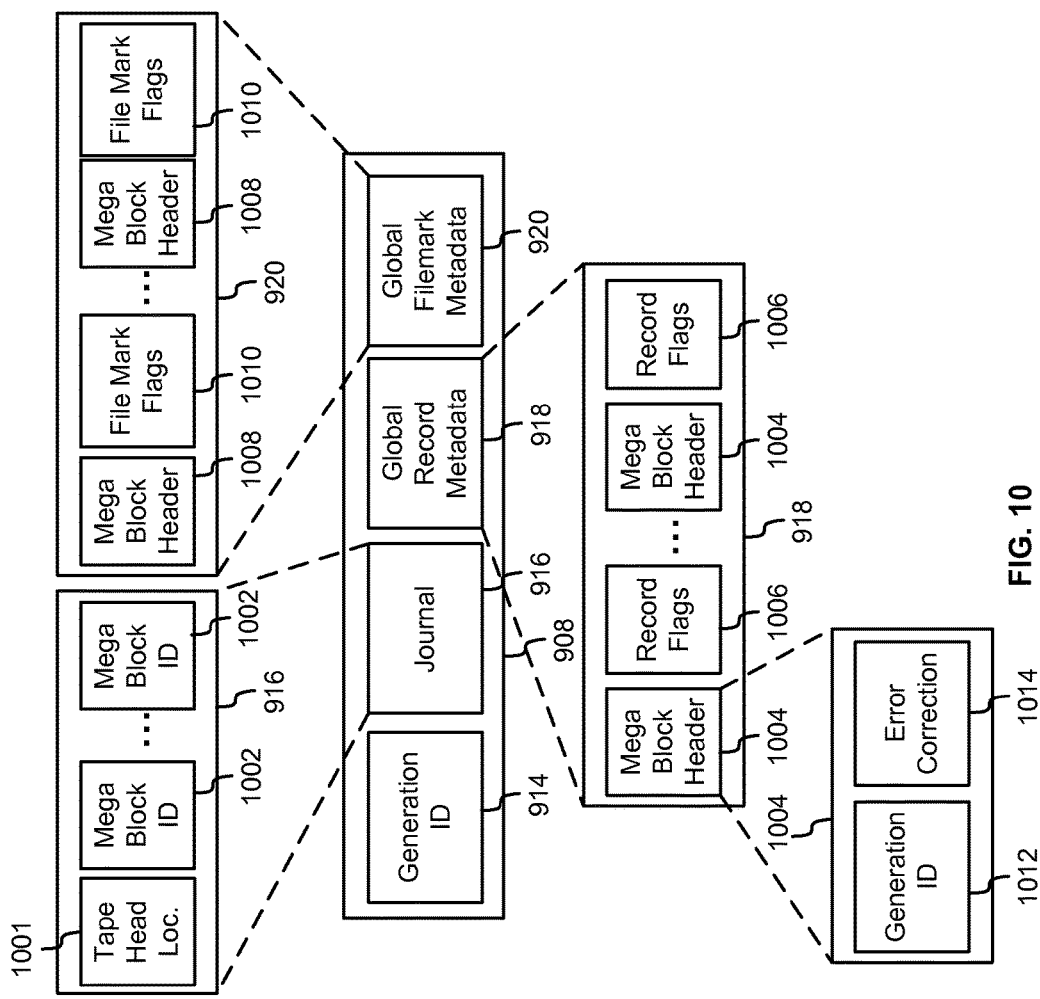
FIG. 10 shows an illustrative example of a virtual tape header in accordance with at least one embodiment.
Figure 11:
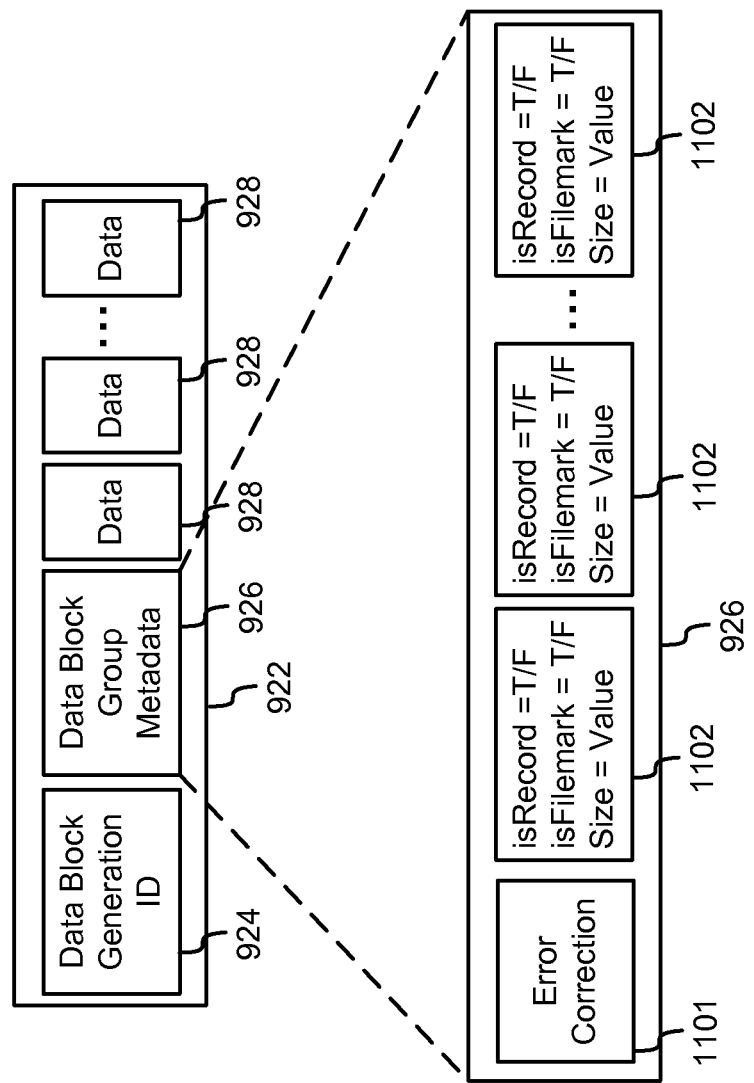
FIG. 11 shows an illustrative example of a virtual tape data block group in accordance with at least one embodiment.

Turning now to FIGS. 9 to 11, an example of a virtual tape structure is shown. The virtual tape structure may contain several advantages over a physical tape. In one embodiment, the virtual tape structure may be stored on a logical data container to aid in emulating functionality of a virtual tape, such as records, tape head location, file marks, seeking, writing and other tape data structures or operations. The logical data container may provide random access to the data rather than sequential access of a physical tape. In another embodiment, the virtual tape structure is organized to aid in accelerating error recovery. For example, the virtual tape structure may contain a journal that identifies potentially inconsistent data in recovery. In some embodiments, the virtual tape structure contains metadata structures that accelerate seek operations. For example, metadata in the header may identify record and/or file mark locations in the data to avoid scanning the entire data set for the markers. In an embodiment, some of the virtual tape structure may exist in a metadata store instead of the virtual tape structure. For example, the virtual tape head location may be stored in the metadata store instead of a global header metadata. In another embodiment, the virtual tape structure also provides a variable size record. For example, a small record may occupy one data block of the tape while a larger record may occupy multiple data blocks across data block groups.

Turning now to FIG. 9, an illustrative example of a virtual tape 902 in accordance with at least one embodiment is shown. A virtual tape 902 as seen by a client archive system 302 in FIG. 3 may comprise a logical data container 904 that comprises a virtual tape structure 906. The virtual tape structure 906 may be used to emulate tape functionality and leverage the ability of a logical data container 904 for random access to data. The virtual tape structure 906 may comprise a global header 908 and one or more data block groups. In some embodiments, the data block groups 910 are grouped into a megablock 912. In some embodiments, data block groups 910 and megablocks 912 are of a consistent size. This size allocation allows for a calculation of a location of a data block group 910 and/or a megablock 912 from the end of the global header to facilitate random access to a data block group 910 and/or a megablock 912. Data alignment may also be observed in substructures discussed, such that substructures may also be consistently found by an offset to a megablock start, data block start or other calculated location. In some embodiments, the data alignment is dependent on hardware specifications. For example, a hard drive upon which the logical data container is stored may use 4,096 byte sectors (4 k). As 4 k of data is a minimum amount that may be written or read from the drive (and not truncated), metadata and data stored to the logical data container may be aligned on 4 k boundaries. However, it should be recognized that other hardware-inspired boundaries may be used including 512 bytes, 2048 bytes, 4 k, 8 k, 16 k, 32 k, 64 k, 128 k, 256 k.

In one embodiment, a megablock size is selected relative to server memory. For example, a megablock size may be selected to be 512 MB, such that two megablocks 912 may be loaded into memory for a total of 1 GB of information. In an embodiment, two megablocks 912 are loaded into memory to retain a first megablock 912 being operated upon and a second megablock 912 immediately following the first megablock 912. By loading these two megablocks 912, if a write or read operation crosses the first megablock boundary, the second megablock 912 is ready for use. The first megablock 912 may then be persisted to disk and a third megablock 912 following the second megablock 912 may be loaded.

In one embodiment shown in FIG. 10, the global header 908 may include a global generation identifier (global generation ID) 914, a journal 916, global record metadata 918 and global file mark metadata 920. The generation ID may be used to identify information within the virtual tape structure 906 that is valid. For example, each data block group 910 may further comprise a data block generation identifier (data block generation ID) 924. If the data block group generation ID 924 does not match the global generation ID 914, then the data in a data block group 910 containing the data block generation ID 924 may be presumed invalid. In one embodiment, data within the virtual tape may be invalidated by replacing the global generation ID 914 with a value that does not match data block group generation IDs 924 within the data blocks 910.

The journal 916 may be used to identify status information of the virtual tape 902. The journal 916 is further broken down in FIG. 10. This status information may include such information as a tape head location 1001 and data loaded into memory, such as megablock identifiers (megablock IDs) 1002. The tape head location may aid in emulating a tape, as a tape is a linear access device. For example, the tape head may determine where the next seek operation starts. A client archive system may request that the tape move to a next record. The tape head location may be adjusted to point to the next record from the tape head in the tape data. A more thorough explanation of a seek operation will be discussed after the introduction of record flags 1006 in FIG. 10.

A record of the data loaded in memory may help during recovery. In the embodiment shown in FIG. 10, the journal 916 comprises megablock IDs 1002. The megablock IDs 1002 represent megablocks 912 loaded into memory for operations. When loaded into memory, a megablock ID 1002 is written into the journal. When unloaded from memory, information about the megablock 912 may be persisted to storage and the journal entries for the megablocks 912 may be removed. If the logical data container fails while one or more megablocks 912 are in memory, the journal may be used to identify which megablocks 912 may be in need of examination and/or repair. This identification of megablocks 912 allows a recovery process to focus on data that may require attention rather than a full scan of the entire tape data, allowing the recovery of the virtual tape to be faster than if the journal 916 was not present or used. Recovery of megablocks is more specifically addressed in relation to data block groups 922 described in conjunction with FIG. 11.

Global record metadata 918 may identify record start locations in the logical data container. A record may be an individual backup entry with an associated size. In one embodiment, the global record metadata 918 may be further broken into sections, where each section is related to a megablock. The global record metadata 918 may comprise megablock headers 1004, each followed by a set of record flags 1006 for the megablock 912 associated with the header. The megablock header 1004 may further comprise a record generation ID 1012 and error correction information 1014. If the record generation ID 1012 does not match the global generation ID 914, the records in the associated megablock 912 may be determined to be invalid. Error correction information 1014 may be used to determine if any errors have occurred in the record flags 1006 following the error correction information 1014. In some embodiments, the error correction information may also be used to correct the record flags 1006 and/or itself, such as a checksum and/or an error-correcting code. Record flags 1006 may represent data blocks in an associated megablock 912. Each data block may have an individual flag to determine whether the data block contains the start of a record. In one embodiment, the record flags are individual bits, with one bit for each data block. The bit may be set to true when the data block is the start of a record and false when the data block is not the start of a record.

The record flags may be used to determine a location of a record. For example, a client archive system may request record number 200 from a start of the virtual tape 902. The virtual tape library appliance may scan the record flags 1006, counting records until a 200th record flag set to true is identified. The identified record flag may then be used to determine a data block location within a megablock 912. In some embodiments, data blocks and, as a result, megablocks may be a standard size. The virtual tape library appliance may use this to its advantage and calculate an offset into the logical data container based at least in part on the global header length, number of megablocks and/or number of data blocks. In another example, a space request may be received from the client archive system. The space request may request a number of records a distance away from a current position of a virtual tape head location 1001.

Global file mark metadata 920 may be stored and utilized similarly to global record metadata 918. A file mark may identify a group of associated records. The global file mark metadata 920 may include a megablock header 1008 and file mark flags 1010. The megablock header 1008 of the global file mark data may also include a generation ID and error correction information. Global file mark metadata 920 may identify file mark locations in the logical data container. File mark flags, like record flags, may identify a data block marked as a start of a file. In some embodiments, the file mark flags 1010 may use one bit to represent each data block in the virtual tape. The file mark flags 1010 may be grouped according to megablocks 912 and used to locate a file mark in the logical data container. For example, a client archive system may request file number 10 from the start of the virtual tape 902. Using the file mark flags 1010, the virtual tape library appliance may count to a tenth file mark flag marked as true. The location of the tenth file mark flag may identify a location of an associated data block in a data block group 910 in a megablock 912. Using that location, an offset from the global header 908 may be calculated at which the data block resides. The tape head location 1001 may also be set to the tenth file mark.

In one embodiment, data block groups 922 from FIG. 9 may comprise a data block generation ID 924, data block group metadata 926 and data blocks 928. The data block generation ID 924 represents validity of the data in the data block group 922. If the data block generation ID 924 matches the global generation ID 914, the data may be considered valid. In an embodiment, if the data block generation ID 924 does not match the global generation ID 914, the data may be considered erased and/or blank. Data block group metadata 926 may describe data blocks 928 in the data block group 922. As seen in FIG. 11, the data block group metadata may comprise error correction 925 and data block metadata 1102 that includes a record flag, file mark flag and size of the record for each data block 928 in the data block group 922. Error correction information 925 may be used to determine if any errors have occurred in the data block group 922. In some embodiments, the error correction information may be used to repair data inconsistencies in the data block group 922 and/or data blocks 928. The record flag may identify a data block 928 that is the start of a record. The file mark flag may identify a start of a file. The size may represent a size of a record. The data block group 922 may also contain data blocks 928 that contain client data.

The data block group metadata 926 allows the virtual tape to support variable record sizes. In some embodiments, a data block size matches the minimum data size supported by storage hardware, such as 4 k block sizes. For example, a record may be written to one or more data block groups 922. The first data block group in the record may have the record flag set in the data block group metadata 926. If the record is also a start of a file, the file mark may also be set to true. The size of the record may then be recorded in the size field in the data block group metadata 926. If the size is less than a block size, the record may be contained in one data block 928. If the size is greater than a block size, the record may be contained in more than one data block 928. The first data block 928 may have the record flag marked as true, while subsequent blocks may be marked as false. The size field may contain the size of the record to be written, which may be repeated in each size field for each data block 928 containing a portion of the record. In some embodiments, a record is limited by a maximum size. Due to this limitation, some data stored to a virtual tape 902 may be stored in multiple records. Reading records may use the size value to determine how much data to return. For example, a record may have a size of 200 bytes with a data block having a size of 4 k bytes. A read for the record may request 512 bytes. As the record is 200 bytes, the smaller value of the record or the request amount is returned. Reads over larger blocks may be aggregated and combined.

Use of journal entries of megablocks in memory and metadata in the data block group 922 may aid during recovery from an error. For example, two megablocks 912 may be loaded in memory. The megablock identifiers, such as location in the logical data container, may be noted in the journal 916 in the global header 908. While operating on these megablocks 912, a storage server hosting the logical data container 904 may encounter an error. Upon recovering from the error, the journal 916 may be reviewed for the megablocks in memory during the error. Because of the failure, global record metadata 918 and global file mark metadata 920 may be out of sync with the data block group metadata 926. The data block groups 922 that comprise the megablocks noted in the journal 916 may be scanned for inconsistencies in the data, including inconsistencies with the error correction 925 information. Repairs, such as making the data consistent, may be performed. Once the scan is complete, record flags and/or file flags in the data block group 922 may be used to make the global record metadata 918 and global file mark metadata 920 consistent with the information stored in the data block groups 922. In some embodiments, data written to a megablock in memory is synchronously persisted to the logical data container, while data is only asynchronously persisted to the global header 908 when the megablock 912 is removed from memory. This removal of the megablock from memory can occur when a read or write moves beyond a megablock boundary, such that a following megablock 912 is requested into memory. Similarly, a request for an unrelated megablock may also trigger persistence of the metadata to the global header. This difference in persistence can lead to inconsistencies when an error occurs while a megablock is in memory.

In one example, a virtual tape may be one terabyte on hardware where the minimum storage increment is 4 kilobytes. A data block may match the hardware storage with each data block being 4 kilobytes of storage. A data block group may include 16 data blocks and data block metadata of 4 kilobytes for a total of 68 kilobytes per data block group. A megablock may be 512 megabytes. Global file mark metadata may be 30 megabytes and global record metadata may also be 30 megabytes. A maximum record size may be 4 megabytes, which corresponds to 1024 data blocks.

An expandable virtual tape drive may be possible. In one embodiment, a client sets a maximum logical data container size. The global header is then sized for the maximum logical data container size, but space for data block groups is added on an as needed basis. This method allows the virtual tape to grow or shrink up to a maximum logical data container size without allocating the entire logical data container from the beginning. In another embodiment, a maximum logical data container size is set by a provider. The global header is sized to the maximum logical data container size and space for data block groups is added on an as needed basis. If the maximum size is or is expected to be exceeded, a new logical data container may be created that increases the global header size, and copies global header information and logical data container data may be transferred to the new logical data container.

Figure 12:
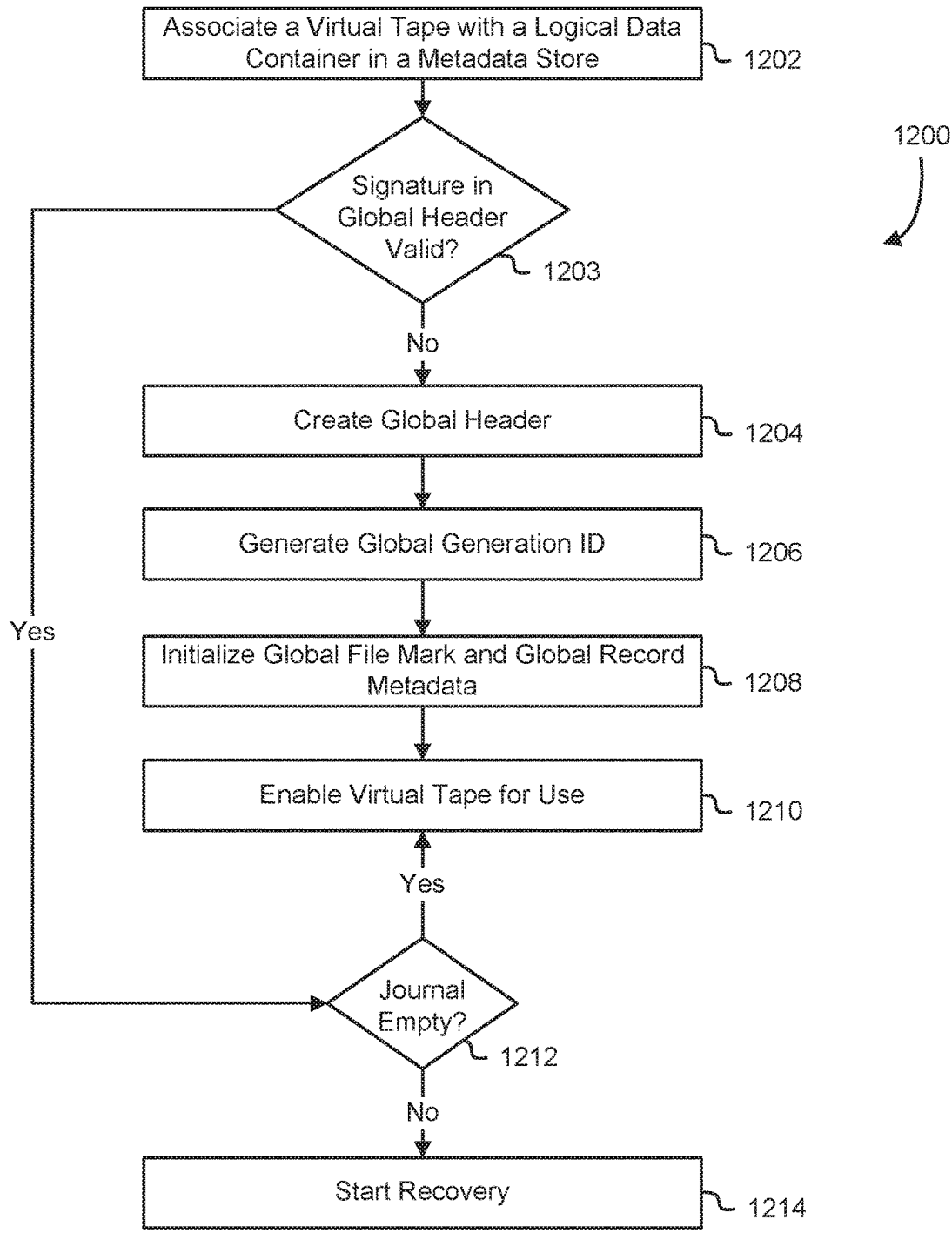
FIG. 12 shows an illustrative example of a process that may be used to create a virtual tape in accordance with at least one embodiment.
Figure 18:
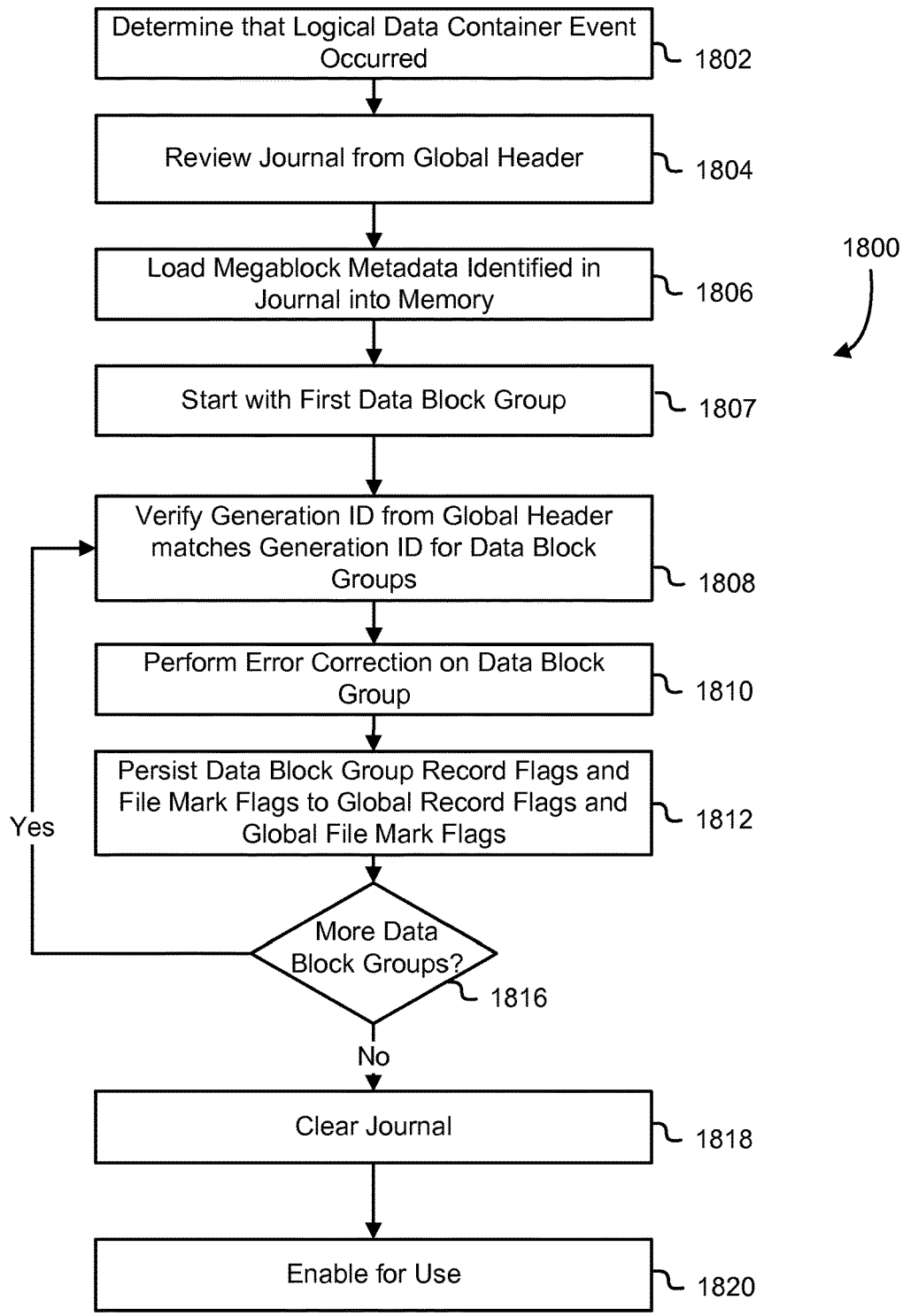
FIG. 18 shows an illustrative example of a process that may be used to recover from an event in a virtual tape in accordance with at least one embodiment.

FIG. 12 shows an illustrative example of a process that may be used to create a virtual tape in accordance with at least one embodiment. This process 1300 may be accomplished by computing resources such as those shown in FIGS. 3 and 9, including a client archive system 302, virtual tape library appliance 304, management servers 306, data servers 308, metadata store 310, provider active storage systems 312, provider archive storage system 314, virtual tape 902, global header 908, megablock 912 and data blocks 910. A logical data container may be requested from the storage service. The logical data container may then be associated 1302 with a virtual tape in a metadata store. If the signature in a global header is 1303 not valid, the logical data container may then be initialized by creating a global header 1304. The global header 1304 may then be populated by creating 1306 a global generation ID and initializing 1308 global file mark metadata and global record metadata. Initializing the global file mark data may include setting all of the global file mark flags to false and associated generation IDs to the global generation ID. Initializing the global record metadata may include setting the global record flags to false and associated generation IDs to the global generation ID. The virtual tape may then be made available for use 1310. However, if the signature in the global header is 1303 valid, the journal in the global header may be checked to see if the journal is 1312 empty. If empty, the virtual tape may be enabled 1310 for use. If not, the virtual tape library appliance may start 1314 a recovery process as seen in FIG. 18.

Depending on the embodiment, operations 1302 to 1314 may be performed at various times. For example, operation 1302 may be performed when a client requests a new virtual tape. Operations 1304 to 1310 may be performed when a virtual tape is requested to be formatted while associated with a virtual tape drive. In another embodiment, operations 1302, 1304 and 1308 may be performed when a new virtual tape is requested. However, a global generation ID is created and stored in the virtual tape when the virtual tape is requested to be formatted when loaded in a virtual tape drive. In another embodiment, all of the operations 1302-1310 are performed upon requesting a new virtual tape, as new virtual tapes are assumed to be formatted.

Figure 13:
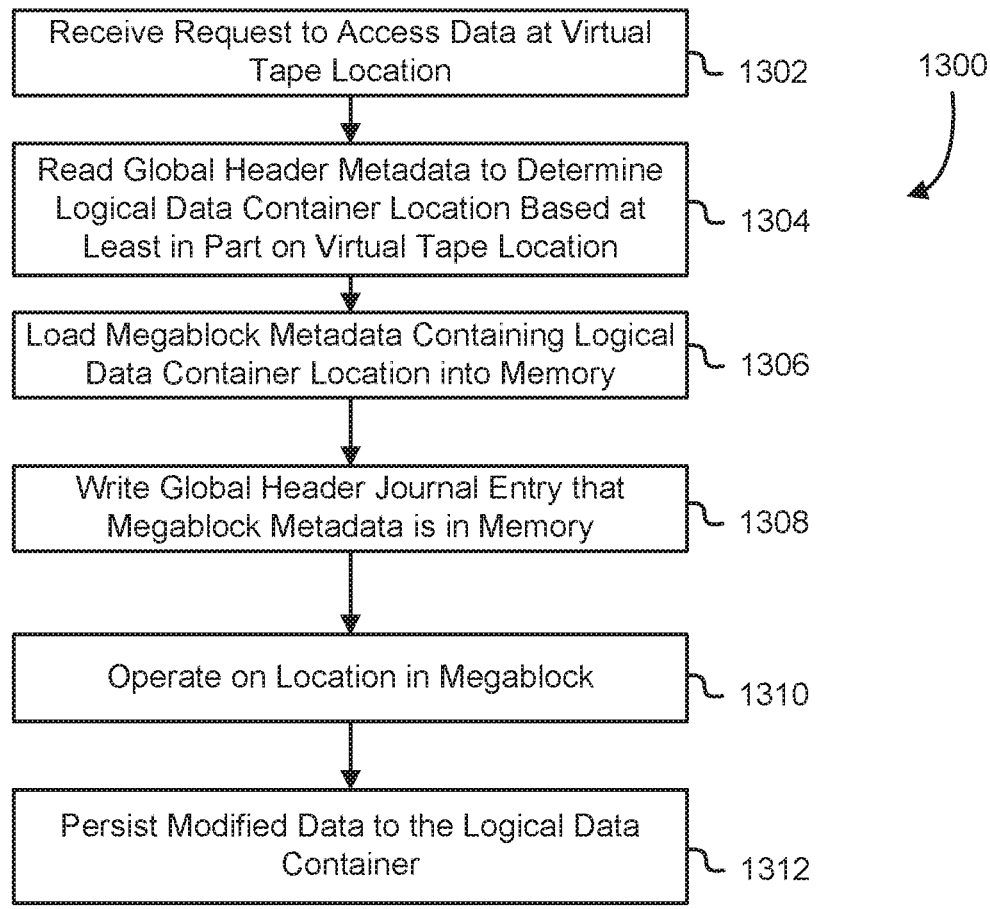
FIG. 13 shows an illustrative example of a process that may be used to operate a virtual tape in accordance with at least one embodiment.

Turning now to FIG. 13, an illustrative example of a process that may be used to operate a virtual tape in accordance with at least one embodiment is shown. This process 1300 may be accomplished by computing resources such as those shown in FIGS. 3 and 9, including a client archive system 302, virtual tape library appliance 304, management servers 306, data servers 308, metadata store 310, provider active storage systems 312, provider archive storage system 314, virtual tape 902, global header 908, megablock 912 and data blocks 910. A virtual tape library appliance may receive 1302 a request to access data on a virtual tape at a location. The global header metadata may be scanned 1304 to determine the location specified based at least in part on the virtual tape location. As the system uses virtual tapes, the location given in relative or absolute terms. For example, a relative request may be a request for a record that is a defined number of records away from the tape head location 1001. An absolute request may be for a record location a specified number of records from the end of the virtual tape or beginning of a virtual tape 902. Once the location is determined, a logical data container location may be calculated to determine an offset from the global header that may be used to arrive at the determined data block 928. The determined megablock metadata may be loaded 1306 into memory. A journal entry may be written 1308 that identifies the megablock metadata is in memory. The megablock may be operated 1310 upon. The data may be synchronously persisted 1312 to the logical data container, while awaiting further instructions. If the data operations pass a megablock boundary or upon completion of the write or megablock, the journal may be updated to reflect the new megablock in memory and changes to the global metadata may be persisted.

Figure 14:
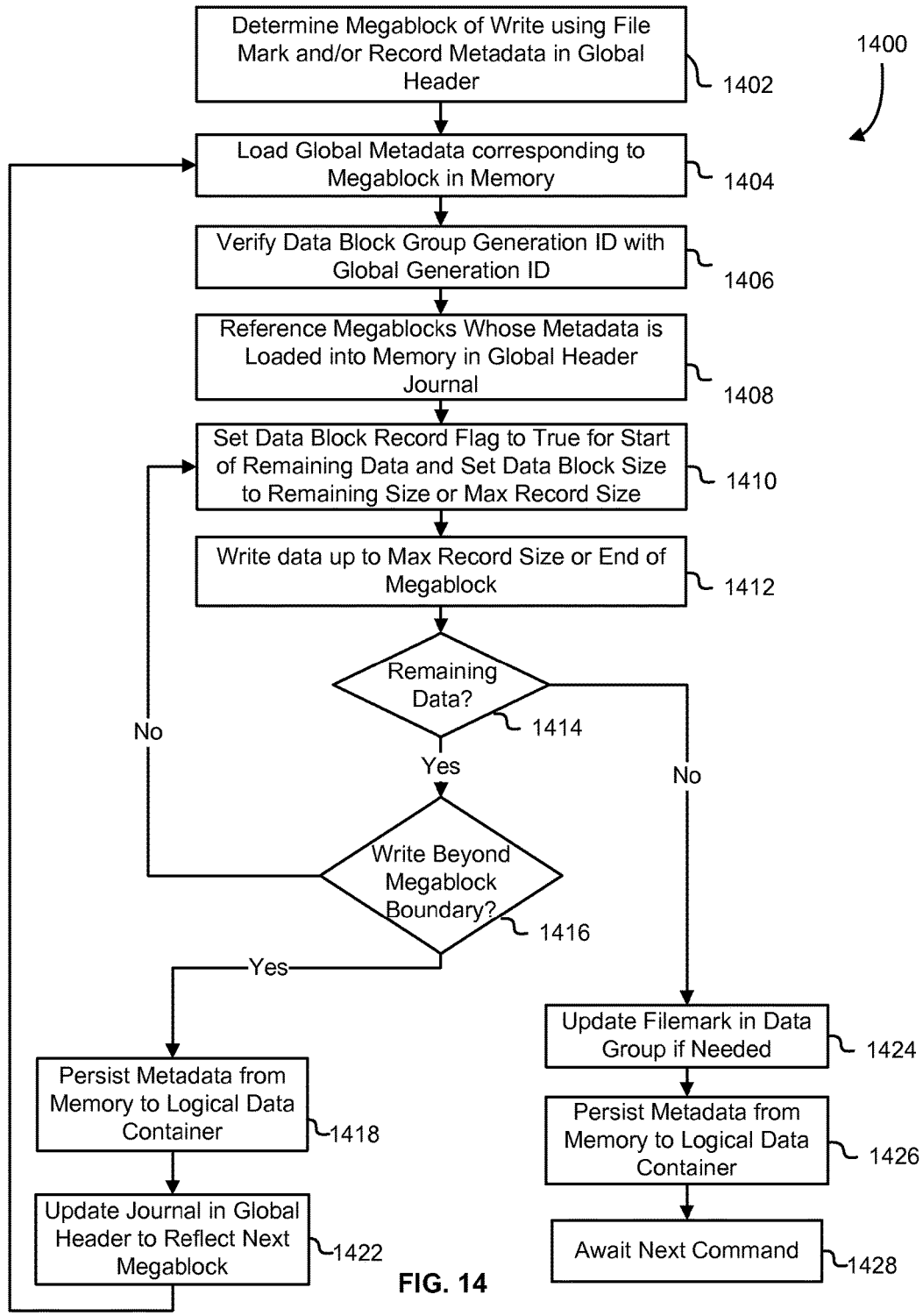
FIG. 14 shows an illustrative example of a process that may be used to write to a virtual tape in accordance with at least one embodiment.

FIG. 14 shows an illustrative example of a process that may be used to write to a virtual tape in accordance with at least one embodiment. This process 1400 may be accomplished by computing resources such as those shown in FIGS. 3 and 9, including a client archive system 302, virtual tape library appliance 304, management servers 306, data servers 308, metadata store 310, provider active storage systems 312, provider archive storage system 314, virtual tape 902, global header 908, megablock 912 and data blocks 910. In some embodiments, a virtual tape drive may have a maximum record length, such as four or sixteen megabytes. Received data that is less than the maximum record size may be written as one record. Received data that is more than the maximum record size may be written across several records.

In an embodiment, records may also cross megablock boundaries. When writing across a megablock boundary, global metadata related to a first megablock may be persisted to the global header, such as global file mark flags and global record flags. The first megablock metadata may be removed from memory and then a consecutive megablock metadata may be loaded into memory. For example, two megablocks' metadata may be loaded into memory and referenced in the journal in the global header. The first megablock may include a location to which a write will start. The second megablock may be consecutive with the first megablock, such that a write will end in the second megablock. When the write transitions from the first megablock to the second megablock, the first megablock may be used to persist global header information about the first megablock, such as global file mark flags and global record flags. While the write continues into the second megablock, the first megablock metadata may be unloaded from memory and removed from the journal. A third megablock consecutive with the second megablock may then have its metadata loaded into memory and referenced in the journal.

When a virtual tape is loaded in a virtual tape drive, the virtual tape library appliance may translate requests to write data on the virtual tape to requests to read data and write data on a logical data container. Metadata in the logical data container may aid the write request to more quickly find data, such as the end of tape through random access than linear access on a physical tape. In the embodiment shown, after receiving the request to write data, a megablock location may be determined 1402 using file mark metadata and/or record metadata in a global header of the logical data container associated with the virtual tape. For example, a write request may seek to place data at an end of tape data. In some virtual tape drives, the end of tape data may be represented by two consecutive file marks. The virtual tape library appliance may scan the global file mark metadata to find two consecutive global file mark flags and then store the location in the virtual tape head location in the journal. A metadata block associated with the determined location of the write may be loaded 1404 into memory. A data block group associated with the write location may be reviewed to make sure the data block group generation ID matches 1406 the global generation ID. If not, the global generation ID may be copied to the data block group generation ID to make the written data valid. The megablock metadata loaded in memory may also be referenced 1408 in a journal in the global header after the loading of the megablock metadata in memory. The starting data block may be noted in associated 1410 data block group metadata as a beginning of a record. The record size may be noted in each metadata entry for data blocks affected by the write. The record size may be the lesser of remaining data or a maximum allowed record size. Data may then be written 1412 up to the record size or an end of the megablock. If there is remaining data 1414 and the write does not 1416 go beyond the end of a megablock, a subsequent record may be created 1410 and further processed. If there is 1414 remaining data and the write goes 1416 beyond a megablock boundary, the data in the megablock may be synchronously persisted to the logical data container and metadata within the global header may be asynchronously updated 1418, such as global file mark flags, global record flags and tape head location. The journal may also be updated 1422 with the retiring of the megablock from memory and a loading 1404 and further processing of a consecutive megablock into memory. If there is no 1414 remaining data, a file mark may be updated 1424 in the data group metadata to mark the end of the write. In some embodiments, two file marks may be used to note an end of data. Data may be synchronously persisted 1426 to the logical data container as writes occur, such that any changes in memory will not be lost, after which, a next command may be awaited 1428.

Figure 15:
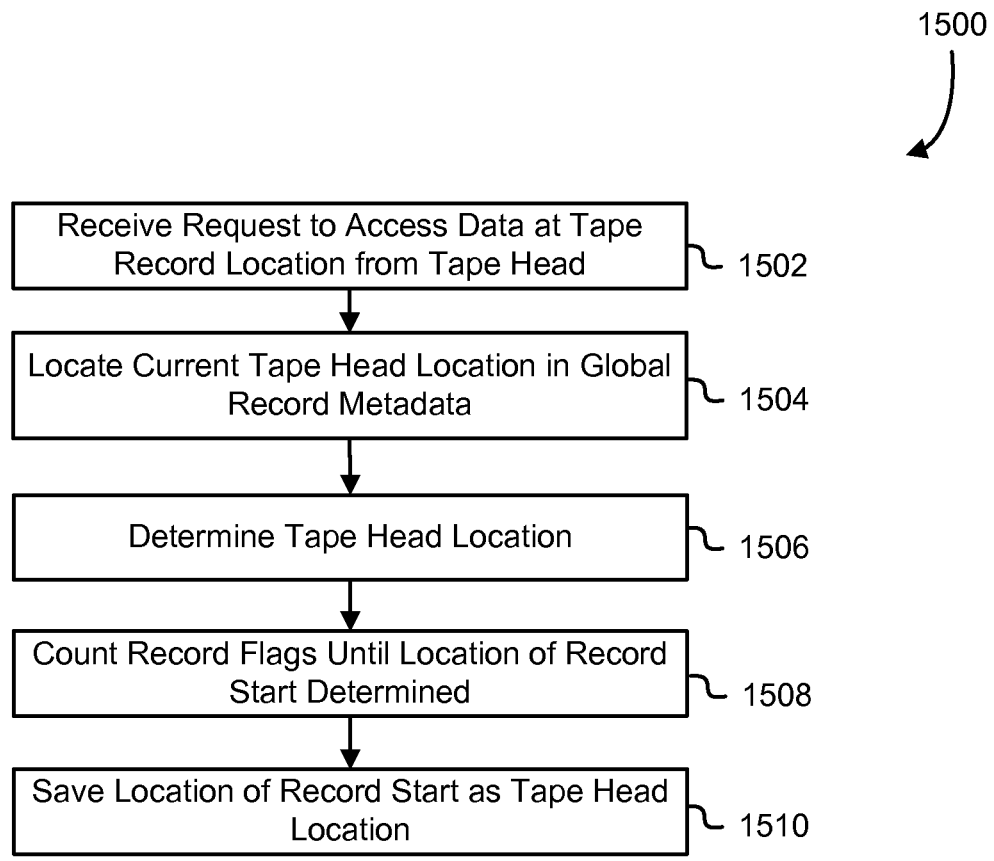
FIG. 15 shows an illustrative example of a process that may be used to seek a record using a virtual tape in accordance with at least one embodiment.

Turning now to FIG. 15, an illustrative example of a process that may be used to seek a record using a virtual tape in accordance with at least one embodiment is shown. This process 1500 may be accomplished by computing resources such as those shown in FIGS. 3 and 9, including a client archive system 302, virtual tape library appliance 304, management servers 306, data servers 308, metadata store 310, provider active storage systems 312, provider archive storage system 314, virtual tape 902, global header 908, megablock 912 and data blocks 910. When a virtual tape is loaded in a virtual tape drive, the virtual tape library appliance may translate requests to seek data on the virtual tape to requests for data on a logical data container. Metadata in the logical data container may aid the seeking request to more quickly find data through random access than linear access on a physical tape. In the embodiment shown, a request to access data at a relative location from the tape head is received 1502. The tape head location is then read from global record metadata 1504. A location in the global record flags is determined 1506 based on the tape head location. Global record flags may then be scanned and counted 1508 until the relative location, such as 5 records toward end of tape, is determined. The scanning may be in forward (toward end of tape) or reverse (toward beginning of tape), depending on the seek command given. Using the determined relative location in the global record flags, a data block and megablock location in the logical data container may also be determined. This location may then be stored 1510 as the tape head location in the global metadata.

Figure 16:
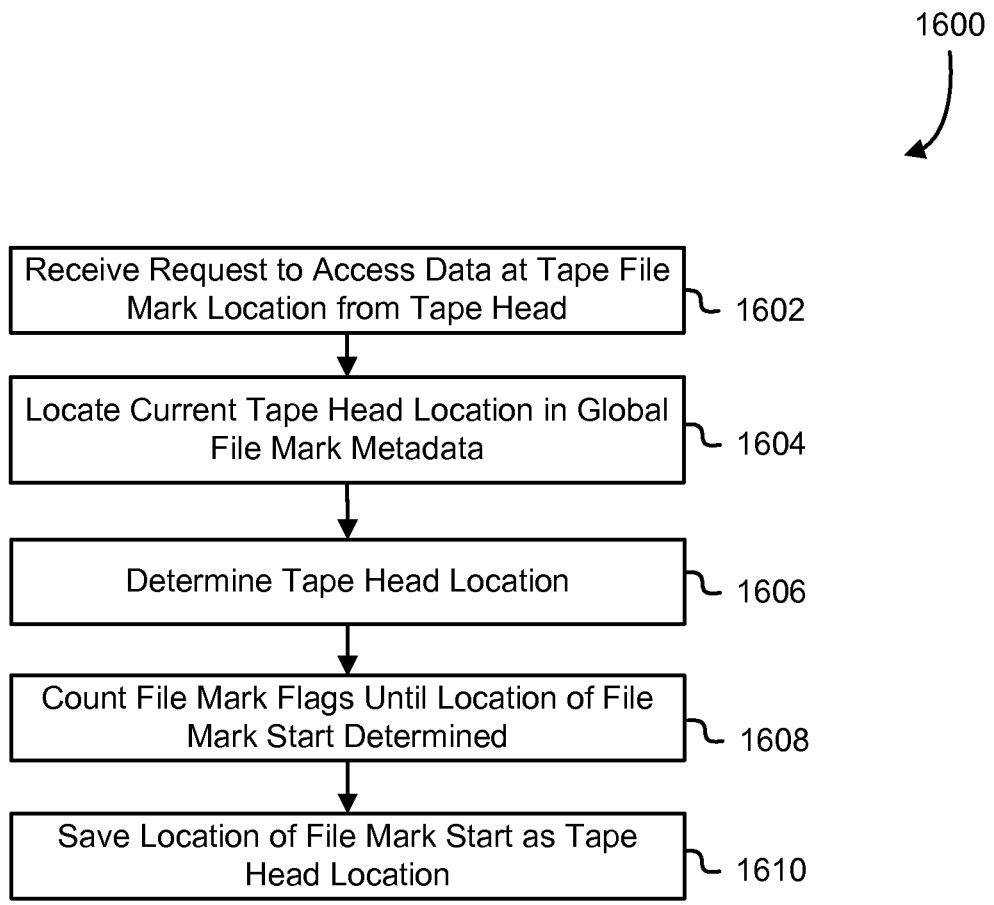
FIG. 16 shows an illustrative example of a process that may be used to seek a file mark using a virtual tape in accordance with at least one embodiment.

Turning now to FIG. 16, an illustrative example of a process that may be used to seek a file mark using a virtual tape in accordance with at least one embodiment is shown. This process 1600 may be accomplished by computing resources such as those shown in FIGS. 3 and 9, including a client archive system 302, virtual tape library appliance 304, management servers 306, data servers 308, metadata store 310, provider active storage systems 312, provider archive storage system 314, virtual tape 902, global header 908, megablock 912 and data blocks 910. This process may be similar to the process described in FIG. 15 with respect to records. In the embodiment shown, a request to seek a file mark at a relative location from the tape head is received 1602. The tape head location is then read from global file mark metadata 1604. A location in the global file mark flags is determined 1606 based on the tape head location. Global file mark flags may then be scanned and counted 1608 until the relative location, such as 5 file marks toward end of tape, is determined. The scanning may be in forward (toward end of tape) or reverse (toward beginning of tape), depending on the seek command given. Using the determined relative location in the global file mark flags, a data block and megablock location in the logical data container may also be determined. This location may then be stored 1610 as the tape head location in the global metadata. A similar process may be used for absolute positioning, such as from beginning of tape or end of tape may be used. The starting location of the tape head may instead be the beginning of tape or end of tape.

Figure 17:
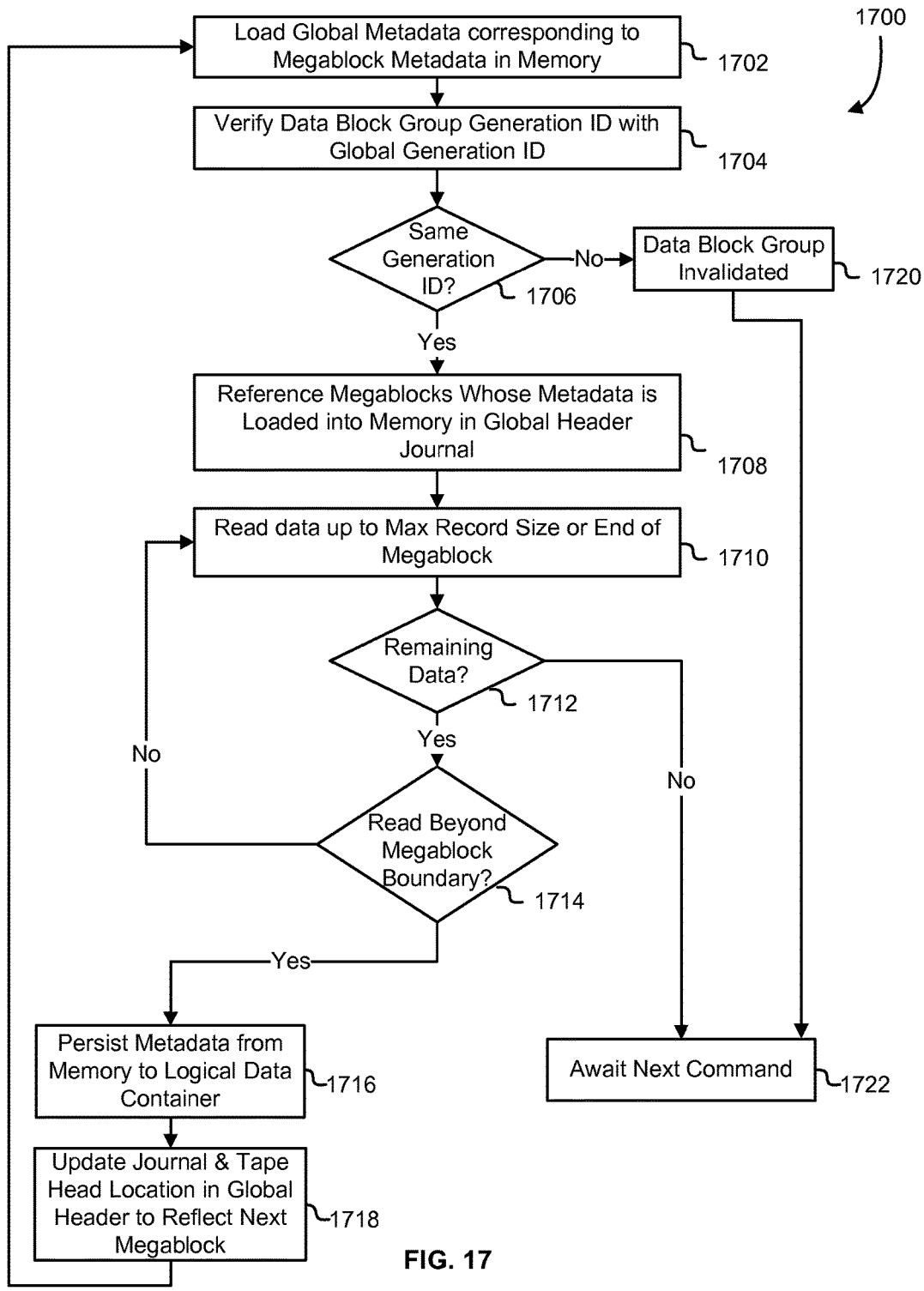
FIG. 17 shows an illustrative example of a process that may be used to read using a virtual tape in accordance with at least one embodiment.

Turning now to FIG. 17, an illustrative example of a process that may be used to read a virtual tape in accordance with at least one embodiment is shown. Megablock metadata may then be loaded into memory 1702 based on a tape head location. A data block group generation ID may then be verified 1704 with a global generation ID. If not 1706 a match, the data block group may be considered invalidated 1720 and, in some embodiments, not read. A next command may then be awaited 1722. If the generation IDs match 1706, a journal in a global header may be updated 1708 that a megablock's metadata is in memory. A record size may be reviewed to determine whether to read up to the record size or end of the megablock. The record size may be the lesser of remaining data or a maximum allowed record size. Data may then be read 1710 up to the record size or an end of the megablock. If there is remaining data 1712 and the read does not 1714 go beyond the end of a megablock, a subsequent record may be read 1710. If there is 1712 remaining data and the write goes 1714 beyond a megablock boundary, the data in the megablock may be synchronously persisted to the logical data container and metadata within the global header may be asynchronously updated 1716, such as global file mark flags, global record flags and tape head location. The journal may also be updated 1718 with the retiring of the megablock from memory and a loading 1702 and further processing of a consecutive megablock and its metadata into memory. If there is no 1712 remaining data, a next command may be awaited 1428.

FIG. 18 shows an illustrative example of a process that may be used to recover from an event in a virtual tape in accordance with at least one embodiment. This process 1800 may be accomplished by computing resources such as those shown in FIGS. 3 and 9, including a client archive system 302, virtual tape library appliance 304, management servers 306, data servers 308, metadata store 310, provider active storage systems 312, provider archive storage system 314, virtual tape 902, global header 908, megablock 912 and data blocks 910. A server hosting a logical data container associated with a virtual tape may have a failure event occur, such as a power failure. Upon recovering from the power failure, the server may inform a management server that the event has occurred and a recovery process started. In some embodiments changes to a megablock in memory are persisted synchronously with the corresponding megablock in the logical data container. However global metadata may be asynchronously updated, such as when a megablock is unloaded from memory. Thus, megablocks in memory, such as those noted in a journal in the global header, may become inconsistent with global header metadata due to the synchronous and asynchronous nature of updating each part of the logical data container. A recovery process therefore would need to resynchronize megablocks noted in the journal with global metadata in the event of a failure.

After determining that an event occurred 1802 that may have an effect on the logical data container, the journal may be reviewed 1804 in the global header of the logical data container. If no entries are in the journal, the logical data container may be returned to service as no repairs are needed. However, any megablocks noted in the journal may be loaded into memory 1806. Starting 1807 with the first data block group of the first megablock, the global generation ID of the global header is compared with a data block group generation ID. If the generation IDs match, the data block may be further examined for errors. If the generation IDs do not match, the data block group may be considered invalid. In some embodiments, error correction may be used and if the error correction causes the generation IDs to match, further recover operations may proceed. Error correction and/or detection may be performed 1810 on the data block group to ensure data integrity. Data block group metadata may be compared against global header metadata such that inconsistencies with the global header data may be fixed in the global header data. For example, data block group record flags and file mark flags may be persisted 1812 to global record flags and global file mark flags in the event that a mismatch is noted. If more data block groups exist 1816 to be scanned, each further megablock may be processed through operations 1808 to 1812. Once the recovery has completed, the journal may be cleared 1818. In some embodiments, the logical data container may again be enabled 1820 for use.

Figure 19:
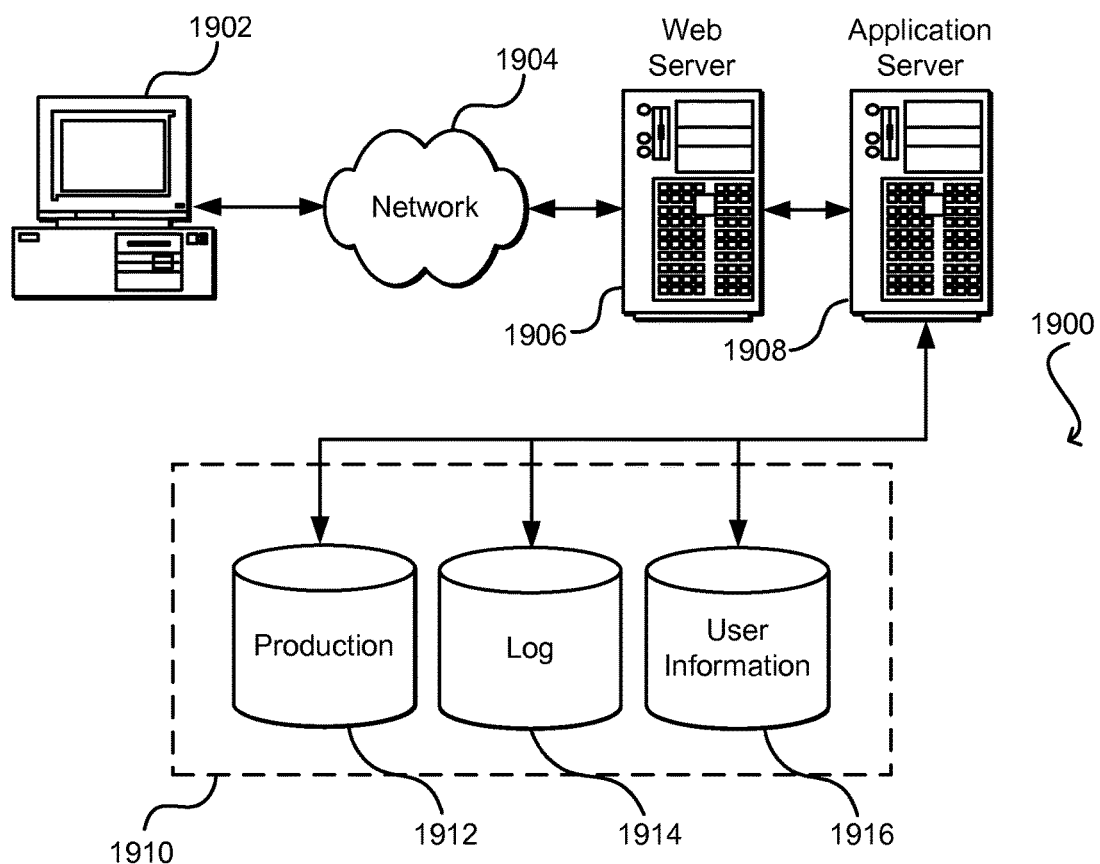
FIG. 19 illustrates an environment in which various embodiments can be implemented.

FIG. 19 illustrates aspects of an example environment 1900 for implementing aspects in accordance with various embodiments. As will be appreciated, although a Web-based environment is used for purposes of explanation, different environments may be used, as appropriate, to implement various embodiments. The environment includes an electronic client device 1902, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1902 and the application server 1908, can be handled by the Web server. It should be understood that the Web and application servers are not required and are merely example components, as structured code discussed herein can be executed on any appropriate device or host machine as discussed elsewhere herein.

The data store 1910 can include several separate data tables, databases or other data storage mechanisms and media for storing data relating to a particular aspect. For example, the data store illustrated includes mechanisms for storing production data 1912 and user information 1916, which can be used to serve content for the production side. The data store also is shown to include a mechanism for storing log data 1914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to create a virtual tape;
   requesting a logical data container be created in a storage service;
   associating the logical data container with a virtual tape, the logical data container having an allocation of space with the storage service;
   receiving a request to load the virtual tape from a virtual storage location to a virtual tape drive;
   mapping the logical data container associated with the virtual tape to an input/output interface associated with the virtual tape drive;
   increasing, as a result of determining that fulfilment of requests received over the input/output interface is predicted to exceed a threshold, the allocation of space of the logical data container to an increased allocation of space with the storage service;
   translating the requests to the logical data container associated with the virtual tape mapped to the virtual tape drive;
   in response to receiving a request to store the virtual tape:
      removing the mapping of the logical data container to the input/output interface; and
   in response to receiving a request to store the virtual tape in an archival storage service:
      mapping the virtual tape to an import/export location;
      removing the virtual tape from a virtual tape library;
      making a determination of an acceptable response time to prepare the logical data container to be used over the input/output interface;
      selecting a storage tier from a plurality of storage tiers based at least in part on the determination to result in a selected storage tier, a storage tier of the plurality of storage tiers defined at least in part on a response time to access logical data containers in the storage tier, the plurality of storage tiers comprising a first storage tier corresponding to a first data storage service having a first response time and a second storage tier corresponding to a second data storage service having a second response time;
      transferring the logical data container from an active tier to be used with the input/output interface to the selected storage tier; and
      associating the virtual tape with a virtual library location.

2. The computer-implemented method of claim 1, further comprising:
   associating the logical data container with a virtual tape in a metadata store; and
   storing a mapping of the virtual tape to a virtual storage location in the metadata store.

3. The computer-implemented method of claim 1, wherein translating requests over the input/output interface to the logical data container further comprises storing data received from a client interface.

4. The computer-implemented method of claim 3, further comprising:
   mapping the logical data container associated with the virtual tape to a second input/output interface associated with a second virtual tape drive; and
   sending stored data from the logical data container over the second input/output interface to the client interface.

5. The computer-implemented method of claim 1, wherein mapping the virtual tape to an import/export location further comprises storing a mapping of the virtual tape to an import/export slot in a metadata store.

6. A computer-implemented method, comprising:
   during a time when a virtual tape and a virtual tape drive are associated, translating tape operations from an input/output interface to a logical data container associated with the virtual tape drive, the logical data container having an allocation of space with a storage service;
   increasing, as a result of determining that fulfillment of requests received over the input/output interface is predicted to exceed a threshold, the allocation of space of the logical data container to an increased allocation of space with the storage service;
   deassociating the virtual tape drive from the virtual tape and the logical data container in response to a request to remove the virtual tape from the virtual tape drive;
   in response to a request to store the virtual tape:
      making a determination of a response time to prepare of the logical data container to be used;
      selecting, based at least in part on the determination, a storage tier from a plurality of storage tiers based at least in part on a speed of access attribute of the storage tier; and
      transferring the logical data container from a current storage tier that includes the input/output interface to a logical data container on the selected storage tier, the current storage tier having a response time that is different than the selected storage tier.

7. The computer-implemented method of claim 6, wherein translating tape operations from the input/output interface to the logical data container further comprises:
   receiving the tape operations from a client interface;
   translating the tape operations to one or more storage service requests; and
   transmitting the one or more storage service requests to the storage service from a client network over a public network to a storage service interface.

8. The computer-implemented method of claim 7, wherein receiving tape operations from the client interface further comprises locating a virtual tape library appliance on the client network; and
   configuring the virtual tape library appliance to receive tape operations and send storage service requests.

9. The computer-implemented method of claim 6, further comprising associating, in a metadata store, the logical data container from a storage service, the virtual tape and the virtual tape drive.

10. The computer-implemented method of claim 9, wherein associating, in the metadata store, the logical data container from the storage service, the virtual tape and the virtual tape drive further comprises:
requesting a logical data container be created in the storage service;
associating the logical data container with the virtual tape in the metadata store; and
storing a mapping of the virtual tape to a virtual import/export slot in the metadata store.

11. The computer-implemented method of claim 6, further comprising:
performing a logical data container copy operation between the logical data container associated with the virtual tape and the virtual tape drive and a second logical data container associated with a second virtual tape and second virtual tape drive when the virtual tape drive is requested to provide data to the second virtual tape drive.

12. The computer-implemented method of claim 6, wherein selecting the storage tier from the plurality of storage tiers further comprises:
receiving a request to move the virtual tape to a storage slot; and
selecting the storage tier from the plurality of storage tiers based at least in part on the storage slot.

13. The computer-implemented method of claim 6, wherein selecting the storage tier from the plurality of storage tiers further comprises:
receiving a request to move the virtual tape to an import/export slot; and
selecting the storage tier from the plurality of storage tiers based at least in part on the import/export slot.

14. A computer system that manages a virtual tape library, comprising:
one or more computing resources having one or more processors and memory including executable instructions that, if executed by the one or more processors, cause the one or more processors to implement:
a virtual tape library system that provides an interface to a client archive system and that:
provides emulation of a tape library system by providing:
a set of virtual tapes, each virtual tape of the set of virtual tapes comprising a storage logical data container from a storage service that provides storage logical data containers upon request, the storage logical data container having an allocation of space with the storage service;
a set of virtual tape drives, each virtual tape drive from the set of virtual tape drives providing an interface to the client archive system to interact with a virtual tape associated with the virtual tape drive;
a media changing interface configured to associate a virtual tape with a virtual tape drive; and
a metadata store that links virtual tapes to the storage logical data containers;
makes a determination of an acceptable response time to prepare the storage logical data container to be used over an input/output interface;
increases, as a result of determining that fulfilment of requests received over the input/output interface is predicted to exceed a threshold, the allocation of space of the storage logical data container to an increased allocation of space with the storage service;
selects a storage tier from a plurality of storage tiers based at least in part on the determination to result in a selected storage tier, a storage tier of the plurality of storage tiers defined at least in part on a response time to access logical data containers in the storage tier, the plurality of storage tiers comprising a first storage tier corresponding to a first data storage service having a first response time and a second storage tier corresponding to a second data storage service having a second response time;
transfers the logical data containers from an active tier to be used with the input/output interface to the selected storage tier; and
associates the virtual tape with a virtual library location.

15. The computer system of claim 14, wherein the virtual tape library further comprises one or more virtual import/export slots configured to transfer the storage logical data container from the storage service to an archival logical data container in an archival storage service.

16. The computer system of claim 14, wherein the virtual tape library further comprises one or more virtual storage slots configured to transfer the storage logical data container from the storage service to an archival logical data container in an archival storage service.

17. The computer system of claim 14, wherein the virtual tape library system further comprises a local storage logical data container that caches interactions from the set of virtual tape drives.

18. The computer system of claim 14, further comprising a second virtual tape library system configured to perform a copy of a first virtual tape managed by the second virtual tape library system onto a second virtual tape managed by the virtual tape library system by requesting a logical data container associated with the first virtual tape be copied to a logical data container associated with the second virtual tape.

19. The computer system of claim 14, further comprising a storage service interface configured to create a new virtual tape and inject the new virtual tape into the virtual tape library system.

20. The computer system of claim 14, wherein the storage service is an object storage service.

21. The computer system of claim 14, wherein the plurality of storage tiers comprises a third storage tier comprising a third data storage service having a third response time.

22. One or more non-transitory computer-readable storage media having collectively stored thereon executable instructions that, if executed by one or more processors of a computer system, cause the computer system to:
provide a virtual tape library interface to a client archive system;
map a set of virtual tapes in a virtual tape library to a set of logical data containers provided by a storage service;
map a logical data container to an input/output interface associated with a virtual tape drive, the logical data container having an allocation of space with the storage service;
increase, as a result of determining that fulfilment of requests received over the input/output interface is predicted to exceed a threshold, the allocation of space of the logical data container to an increased allocation of space with the storage service;

translate tape operations from the client archive system to the logical data container;

make a determination of an acceptable response time to prepare of the logical data container to be used over the input/output interface;

select a storage tier from a plurality of storage tiers based at least in part on the determination to result in a selected storage tier, a storage tier of the plurality of storage tiers defined at least in part on a response time to access logical data containers in the storage tier, the plurality of storage tiers comprising a first storage tier corresponding to a first data storage service having a first response time and a second storage tier corresponding to a second data storage service having a second response time;

transfer the logical data container from an active tier to be used with the input/output interface to the selected storage tier; and associate the virtual tape drive with a virtual library location.

23. The non-transitory computer-readable storage media of claim 22, wherein the executable instructions further comprise instructions that, when executed, cause the computer system to at least:

remap the logical data container from the logical data containers to a virtual library location; and map a second logical data container associated with a virtual tape from the set of virtual tapes to the input/output interface.

24. The non-transitory computer-readable storage media of claim 22, wherein the executable instructions further comprise instructions that, when executed, cause the computer system to at least:

receive a request to move a virtual tape to an import/export slot over the virtual tape library interface;

remap the logical data container to a virtual library location; and request the storage service to transfer the logical data container to an archival storage service.

25. The non-transitory computer-readable storage media of claim 22, wherein the executable instructions further comprise instructions that, when executed, cause the computer system to at least:

submit a request to an archival storage service to transfer an archival logical data container to a second logical data container in the storage service; and map the second logical data container to an import/export slot in the virtual tape library.

26. The non-transitory computer-readable storage media of claim 22, wherein mapping the set of virtual tapes in the virtual tape library to the set of logical data containers provided by the storage service further comprises storing results of the mapping in a metadata store.

* * * * *